US007767057B2

(12) United States Patent
Rosencrance et al.

(10) Patent No.: US 7,767,057 B2
(45) Date of Patent: *Aug. 3, 2010

(54) DEINKING BLENDS FOR USE IN REDUCED ALKALI SYSTEMS

(75) Inventors: Scott William Rosencrance, Douglasville, GA (US); Charles Mesumbe Ngome, Austell, GA (US)

(73) Assignee: Kemira Chemicals, Inc., Marietta, GA (US)

( * ) Notice: Subject to any disclaimer, the term of this patent is extended or adjusted under 35 U.S.C. 154(b) by 696 days.

This patent is subject to a terminal disclaimer.

(21) Appl. No.: 11/650,687

(22) Filed: Jan. 8, 2007

(65) Prior Publication Data

US 2007/0107859 A1    May 17, 2007

Related U.S. Application Data

(63) Continuation of application No. 10/706,450, filed on Nov. 12, 2003, now Pat. No. 7,169,257.

(51) Int. Cl.
D21C 5/02    (2006.01)

(52) U.S. Cl. .............................. 162/4; 162/5; 510/174; 252/61

(58) Field of Classification Search ................. 162/4–5; 210/703–705; 510/174; 252/60–61
See application file for complete search history.

(56) References Cited

U.S. PATENT DOCUMENTS

| 587,099 A | 7/1897 | Levi |
| 4,013,505 A | 3/1977 | Balcar et al. |
| 4,483,742 A | 11/1984 | Bridle |
| 4,561,933 A | 12/1985 | Wood et al. |
| 4,780,179 A | 10/1988 | Clement |
| 4,820,379 A | 4/1989 | Darlington |
| 4,959,123 A | 9/1990 | Lehmann et al. |
| 4,971,656 A | 11/1990 | Lehmann et al. |
| 5,102,500 A | 4/1992 | Darlington |
| 5,221,433 A | 6/1993 | Daute et al. |
| 5,225,046 A | 7/1993 | Borchardt |
| 5,227,019 A | 7/1993 | Borchardt |
| 5,228,953 A | 7/1993 | Bast et al. |
| 5,234,545 A | 8/1993 | Fabry et al. |
| 5,258,099 A | 11/1993 | Borchardt |
| 5,259,969 A | 11/1993 | Srivatsa et al. |
| 5,282,928 A | 2/1994 | Takahashi |
| 5,286,346 A | 2/1994 | Engelskirchen et al. |
| 5,288,369 A | 2/1994 | Ishibashi |
| 5,308,448 A | 5/1994 | Behler et al. |
| 5,332,474 A | 7/1994 | Maxham |
| 5,342,483 A | 8/1994 | Hwang |
| 5,346,543 A | 9/1994 | Hirakouchi et al. |
| 5,362,363 A | 11/1994 | Smolka et al. |
| 5,401,360 A | 3/1995 | Galland |
| 5,415,733 A | 5/1995 | Robinson et al. |
| 5,417,808 A | 5/1995 | Okamoto et al. |
| 5,429,716 A | 7/1995 | Hache et al. |
| 5,442,082 A | 8/1995 | Uphues et al. |
| 5,505,817 A | 4/1996 | Rodriguez et al. |
| 5,512,134 A | 4/1996 | Daute et al. |
| 5,527,426 A | 6/1996 | Marwah et al. |
| 5,540,814 A | 7/1996 | Curtis et al. |
| 5,601,689 A | 2/1997 | Sacripante et al. |
| 5,622,597 A | 4/1997 | Callen et al. |
| 5,637,191 A | 6/1997 | Langley et al. |
| 5,651,861 A | 7/1997 | Larson et al. |
| 5,667,927 A | 9/1997 | Kubota et al. |
| 5,696,292 A | 12/1997 | Cody et al. |
| 5,712,233 A | 1/1998 | Rasheed |
| 5,725,730 A | 3/1998 | Smolka et al. |
| 5,801,135 A | 9/1998 | Miyauchi et al. |
| 5,807,464 A | 9/1998 | Jobbins et al. |
| 5,811,381 A | 9/1998 | Emalfarb et al. |
| 5,817,212 A | 10/1998 | Jobbins et al. |
| 5,837,099 A | 11/1998 | Borchardt |
| 5,882,476 A | 3/1999 | Evans et al. |
| 5,968,313 A | 10/1999 | Bentley |
| RE36,424 E | 12/1999 | Clement |
| 6,210,526 B1 | 4/2001 | Pohlen |

(Continued)

FOREIGN PATENT DOCUMENTS

CN    1088952    7/1994

(Continued)

OTHER PUBLICATIONS

Balos, B. et al., "Flotation Deinking Chemistry," PaperAge, 1990, No. 1990 Recycling Annual, pp. 15-17.
Deng, Y., "Flotation Deinking Chemistry: Current Research Program at IPST," IPST, Technical Paper Series, 699 (Atlanta, GA), p. 11.
Epple, M. et al, The Effect of Absorbed Surfactants on the Electrostatics Properties and Wettability of a Photocopy Toner, Prog. Rap. Recycling, vol. 3, No. 2, Feb. 1994, pp. 52-59, ISSN: 1061-1452.
Hornfeck, K. et al., "Investigations of Interfaces and Technological Tests about Flotation of Printing Inks and Fillers," Wochenblatt fuer Papierfabrikation, 1990, vol. 118, No. 21, pp. 935-941, ISSN: 0043-7131.
Larson, E. et al., "Effects of Polymeric Additives in Flotation of Water Based Pigments during Recycling of Newsprints," 1997 Recycling Symposium, 1997, Chicago, IL, Apr. 14-16, 1997, pp. 167-173, Atlanta, GA.
Park, K. et al., "Modification of Cellulose with Polyalkylene Oxide Allyl Ester-Maleic Acid Anhydride Copolymer and its Application to the Pulp and Paper Industry," J. Appl. Polym. Sci., May 2002, vol. 84, No. 5, pp. 894-899.

(Continued)

Primary Examiner—Carlos Lopez
(74) Attorney, Agent, or Firm—King & Spalding

(57) ABSTRACT

The present invention relates to methods and compositions for deinking waste paper, optionally in non-alkaline or low-alkaline systems. Deinking compositions are provided that include a blend of an alkoxylated fatty alcohol and a fatty acid. The compositions may further include a second alkoxylated fatty alcohol. The deinking compositions also may include a first non-alkoxylated fatty acid and optionally a second alkoxylated fatty acid. Cationic derivatives such as cationic polymers also may be added to the deinking blend.

29 Claims, No Drawings

U.S. PATENT DOCUMENTS

| | | | |
|---|---|---|---|
| 6,312,559 | B1 | 11/2001 | Irinatsu et al. |
| 6,376,455 | B1 | 4/2002 | Friedli et al. |
| 6,540,870 | B1 | 4/2003 | Laurila-Lumme et al. |
| 6,544,383 | B2 | 4/2003 | Robinson et al. |
| 2002/0025295 | A1 | 2/2002 | Kim |
| 2002/0066880 | A1 | 6/2002 | Robinson et al. |
| 2002/0157798 | A1 | 10/2002 | Franks et al. |
| 2003/0106654 | A1 | 6/2003 | Li et al. |
| 2003/0125534 | A1 | 7/2003 | Callen et al. |
| 2003/0157595 | A1 | 8/2003 | Emalfarb et al. |

FOREIGN PATENT DOCUMENTS

| | | |
|---|---|---|
| CS | 205602 | 5/1981 |
| CS | 266815 | 1/1990 |
| DE | 2856845 | 7/1980 |
| DE | 4007596 | 9/1991 |
| DE | 4007597 | 9/1991 |
| DE | 4007598 | 9/1991 |
| DE | 19508936 | 9/1996 |
| DE | 19631150 | 2/1998 |
| EP | 0013027 | 12/1979 |
| EP | 0013758 | 12/1979 |
| EP | 0307024 | 3/1989 |
| EP | 0492507 | 7/1992 |
| EP | 0507325 | 10/1992 |
| EP | 0657578 | 12/1994 |
| EP | 0741203 | 4/1996 |
| EP | 0717144 | 6/1996 |
| EP | 0726246 | 8/1996 |
| EP | 0834614 | 4/1998 |
| FR | 2087745 | 2/1972 |
| JP | 58149394 | 9/1983 |
| JP | 59150191 | 8/1984 |
| JP | 02160984 | 12/1988 |
| JP | 01006190 | 1/1989 |
| JP | 05025789 | 7/1991 |
| JP | 03193987 | 8/1991 |
| JP | 0420879 | 7/1992 |
| JP | 06228894 | 1/1993 |
| JP | 07145582 | 11/1993 |
| JP | 07189154 | 12/1993 |
| JP | 06049791 | 2/1994 |
| JP | 06192986 | 7/1994 |
| JP | 08120582 | 5/1996 |
| JP | 10053988 | 2/1998 |
| JP | 10088489 | 4/1998 |
| JP | 10101982 | 4/1998 |
| JP | 10102390 | 4/1998 |
| JP | 10102391 | 4/1998 |
| JP | 10219574 | 8/1998 |
| JP | 10338828 | 12/1998 |
| JP | 11001883 | 1/1999 |
| JP | 1110784 | 4/1999 |
| JP | 1140781 | 5/1999 |
| JP | 2001011786 | 1/2001 |
| JP | 2003012909 | 6/2001 |
| JP | 2003073987 | 9/2001 |
| JP | 2001279588 | 10/2001 |
| JP | 2001288395 | 10/2001 |
| JP | 2001355189 | 11/2001 |
| JP | 2002173884 | 6/2002 |
| SK | 278679 | 12/1997 |
| SU | 0926129 | 5/1989 |
| WO | WO 90/05805 | 5/1990 |
| WO | WO 91/03599 | 3/1991 |
| WO | WO 93/22491 | 11/1993 |
| WO | WO 95/00699 | 1/1995 |
| WO | WO 95/26398 | 3/1995 |
| WO | WO 95/09909 | 4/1995 |
| WO | WO 95/27779 | 4/1995 |
| WO | WO 95/12026 | 5/1995 |
| WO | WO 95/15296 | 6/1995 |
| WO | WO 96/11262 | 4/1996 |
| WO | WO 96/13574 | 5/1996 |
| WO | WO 96/31646 | 10/1996 |
| WO | WO 97/14844 | 4/1997 |
| WO | WO 97/22750 | 6/1997 |
| WO | WO 97/22751 | 6/1997 |
| WO | WO 97/48850 | 6/1997 |
| WO | WO 97/32076 | 9/1997 |
| WO | WO 97/46753 | 12/1997 |
| WO | WO 97/46754 | 12/1997 |
| WO | WO 98/45530 | 10/1998 |

OTHER PUBLICATIONS

Putz, H. et al., "Deinking of Oil-and Water-born Printing Inks—A New Flotation Deinking Model," Paper presented at $1^{st}$ Research Forum on Recycling held Oct. 29-31, 1991 at Toronto, Canada, p. 183-190 [Montreal, CA: Canadian Pulp and Paper Association, 1991, p. 223.

Santos, A. et al., "Contribution to a Better Understanding of the Basic Mechanisms Involved in the Pulping and Flotation of offset Ink Particles," 1996 Recycling Symposium, New Orleans, LA, Mar. 5-7, 1996, TAPPI Press, pp. 339-348.

Schmitt, G. et al., "1991 Recycling Patents Review," Prog. Pap. Recycling, vol. I, No. 3, May 1992, pp. 74-77.

Suess, H. et al., "Two-Stage Alkaline-Acidic Flotation for Eliminating Difficultly Removable Printing Inks from Waste Paper," Papier, Mar. 1991, vol. 45, No. 3, pp. 89-96.

Turrado, S. et al., Influence of Surfactants in Deinking, Invest. Tec. Pap., vol. 32, No. 123, Jan. 1995, pp. 103-123, ISSN: 0368-0789.

Wu, G. et al., "Collector Chemistry in flotation Deinking of Photocopy Papers," Progress in paper Recycling, 1998, 7(4), pp. 20-27, Institute of Paper Science and Technology, Atlanta, GA.

Xia, Z. et al., "Effects of Cellulases on the Surfactant-Assisted Acidic Deinking of ONP and OMG," Prog. Pap. Recycling, vol. 5, No. 4, pp. 46-58.

DEINKING BLENDS FOR USE IN REDUCED ALKALI SYSTEMS

RELATIONSHIP TO PRIOR APPLICATIONS

This application is a continuation of U.S. Ser. No. 10/706,450, filed Nov. 12, 2003, now U.S. Pat. No. 7,169,257.

FIELD OF THE INVENTION

The present invention relates to methods and compositions for deinking waste paper, preferably in non-alkaline or low-alkaline systems.

BACKGROUND OF THE INVENTION

The paper industry has been practicing wastepaper recycling to regenerate usable cellulosic fiber for paper making for many decades. In these processes, ink is removed from the wastepaper pulp using a suitable deinking composition. The deinking process produces a new paper or paperboard product out of materials that might otherwise have ended up in a landfill.

Because of increasing public demand, the use of recycled paper has steadily increased. To recover the fibers used for papermaking from wastepaper, a waste paper deinking operation must generally be carried out to remove the inks used in printing, and thus create suitable characteristics for re-use. Traditionally, deinking has been conducted by either washing or flotation deinking.

Wastepaper may contain a mixture of newspapers, magazines, telephone directories, printed advertising material, corrugated containers and the like. The paper fibers used to produce these materials may be chemically pulped materials, such as Kraft pulps, or may be mechanical produced pulps, such as groundwood or mixtures thereof. Much of this wastepaper has undergone some form of printing operation thus leaving a deposit of ink on the paper. To date, wastepaper recycling has concentrated on removal of the ink, prior to re-use of the recycled waste paper for further printing.

The basic stages in a typical washing or flotation deinking process are: repulping the wastepaper in a repulper; coarse cleaning and screening of the repulped material; washing and/or flotation deinking; fine cleaning and screening; post-bleaching, and finally, storage.

A key component in a typical old newspaper (ONP) deinking operation is treatment of the waste paper in the repulper. In the repulper, the wastepaper is typically treated in water with chemicals such as caustic soda, sodium silicate and hydrogen peroxide. A metal chelating additive may also be included.

Repulping is often followed by a series of coarse cleaners and screens to remove large particles, like staples and plastics from the pulp. The cleaned pulp is passed to either a wash or a flotation deinking stage.

Conventionally, two different methods are employed to isolate the ink and ink related entities in order to produce the deinked fiber after repulping. These two processes are flotation and washing. The underlying chemical and physical goals to successfully deink are different for these two methods.

For instance, washing typically requires fine dispersion of ink that is modified to be hydrophilic in nature and thus well dispersed so as to successfully be washed out of the stock thus resulting in the desired separation of ink from the fiber system or deinking. The ink and fiber are more or less uniformly distributed throughout the slurry, and foaming or bubble formation, though present, is not particularly desired. The objective in the washing process is to release and liberate the ink from the fiber into an aqueous medium and then separate the ink and associated entities from the fiber. Thus, the washing method typically comprises repulping, preferably under low-foaming conditions, of secondary fiber in an ink-removing aqueous medium, whereby the ink (and other non-cellulosic contaminants, if present) is mechanically and/or chemically removed as desired depending on the process goals from the fiber. The repulping step is then typically followed by at least a partial change of the aqueous medium, e.g. dilution and/or screening. Wash deinking can occur in the field at pH's lower than 8. This is in part because certain surfactants are known to modify interfacial properties successfully at low pH but these surfactants also modify the ink into a hydrophilic dispersed state that is good for washing but very bad for flotation.

Flotation processes are fundamentally different that washing processes in that the ink may need to be agglomerated following release and liberation for the fiber surfaces. This alteration of ink characteristics can facilitate attachment to air bubbles as well as assists to impart sufficient hydrophobic character to the released and liberated ink and ink related moieties to favor attachment to and stabilization to the air or other gaseous bubbles which is the means of separating the ink from the fiber system. Flotation methods of ink isolation generally involve passing a stream of air bubbles through an aqueous stream of dispersed cellulose fiber (i.e., the repulped cellulose fiber slurry), the cellulose fiber slurry having therein flotation additives, which promote the adhesion of ink particles to the air bubbles. The air bubbles rise within the fiber slurry and carry the ink particles with them thereby generating foam which can be removed from the flotation cell. This method relies upon an unequal distribution of the ink and fiber in the slurrying-flotation medium. Gaseous entities other than air can also be used to generate the bubbles used for flotation during a deinking process that includes one or more flotation steps.

Flotation deinking utilizes a fundamentally different class of surfactants relative to washing because the resulting surface properties are not conducive to washing due to their size distribution and agglomeration states as well as their surface hydrophobicity and lack of dispersion and hydrophilicity that is common for wash deinking. In addition, flotation deinking has historically relied on a high pH pulping liquor to assist in removing ink from the fiber that can then be separated via flotation. This high pH both can also assist in swelling the fibers which may also facilitate ink removal as well as chemically modifying certain points of chemical attachment between the ink and fiber can allow for more efficient ink liberation and release.

Both the washing and flotation processes depend on the proper use of surfactant. Depending on the relative contributions and characteristics of the hydrophilic versus hydrophobic portion of the surfactant molecule, the surfactant will interact in various manners with the ink and other contaminant particles thus rendering the particles hydrophilic for washing purposes or more hydrophobic for flotation. The opposing natures of washing surfactant and flotation surfactant can cause problems in combination flotation/washing systems. The deinking mechanism for washing method is quite different from that for the flotation method and, therefore, they require the use of deinking compositions having different properties.

Typically, either a flotation derived or washing derived deinking chemistry is utilized in a given deinking system. At some point in either process, the deinked, repulped wastepaper is often passed through a series of fine cleaners and/or screens where the small particlulate contaminants, like sand and grit are removed. Additional processing stages may be required, such as for example, dispersion, to reduce the particle size of any contaminants, or a special cleaning stage with special cleaners designed to remove specific contaminants. Further, the repulped wastepaper may also be treated with bleaching chemicals to increase the whiteness and brightness of the pulp.

The deinked wastepaper is then held in storage until it is eventually fed to a papermaking machine. The deinked wastepaper thus provides a furnish of pulp which may be combined with other paper furnishes to eventually produce the saleable paper product.

The chemistry involved in traditional deinking very often involves addition of caustic soda in the repulper to increase the pH. Increasing the pH, however, will often cause yellowing and darkening of the wastepaper stock especially when the wastepaper contains groundwood or mechanical pulps. To counteract the undesirable darkening effect, a bleaching additive is added.

Deinking aids can be solid at room temperature and as such must be heated continually from raw material until use in the mill. This poses a potential problem for clogging lines and shutting down deinking operations.

Accordingly, repulping in a deinking mill might traditionally comprise a repulping unit operation that is conducted at 3.5 to 28% consistency (a term used in the paper industry to describe the concentration (w/v) of an aqueous slurry of pulp fibers), at a pH of 8.8 to 11.5, for 5 to 30 minutes, and at a temperature of 32° C. to 60° C. A typical repulping liquor might comprise additions of the order of 1.5% sodium hydroxide, 3% sodium silicate, and 1% hydrogen peroxide. The treated pulp exiting the repulper is usually dark in color, and is subsequently fed to the wash and/or flotation deinking stage for separation of the ink from the pulp.

The use of a substituted oxyethylene glycol nonionic surfactant along with a low molecular weight polyelectrolyte for deinking secondary fiber is described in U.S. Pat. No. 4,599,190 to Maloney. U.S. Pat. No. 5,094,716 describes a process for deinking groundwood newsprint wherein a combination of certain anionic surfactants in conjunction with a defoamer and a naphthalene-formaldehyde condensate is used.

The removal of electrostatic inks and toners from xerographically printed waste paper has been described for example in U.S. Pat. No. 4,561,733 to Wood, U.S. Pat. No. 4,276,118 to Quick; U.S. Pat. Nos. 4,820,379 and 5,102,500 both to Darlington.

Enzymes have been used in the treatment of paper pulps and for purifying the waste water effluents from paper mill operations. Japanese Pat. Nos. JP 2160984 and JP 2080684 describe the use of the enzyme, lipase, in the hydrolysis of soya-based inks. The use of another enzyme, cellulase, has been described in Japanese patent No. JP 2080683. European patent application No. EP 447672 describes deinking waste paper using a lignolytic enzyme.

U.S. Pat. No. 4,518,459 discloses a deinking method using a deinking composition obtained by adding a predetermined amount of propylene oxide to the terminal hydroxyl groups of alcohols or ethylene oxide adducts of alkylphenols, or by modifying, with benzyl ether, the terminal hydroxyl groups of alcohols or ethylene oxide- or ethylene oxide/propylene oxide block-adducts of alkylphenols.

U.S. Pat. Nos. 3,021,372; 2,856,434; 2,903,486; 3,340,309; 3,444,242 and 3,625,909 disclose compounds which are prepared by adding alkylene oxides to alcohols or alkylphenols.

U.S. Pat. No. 4,162,186 discloses a deinking composition comprising a combination of an oil-soluble alcohol ethoxylate with a water-soluble alcohol ethoxylate.

U.S. Pat. No. 5,094,716 describes the use of a combination of an anionic surfactant and an anionic dispersant for use in removal of hydrophobic inks in wash processes.

U.S. Pat. No. 4,599,190 describes the use of polyelectrolyte dispersants in combination with nonionic surfactants in wash deinking of secondary fiber.

U.S. published application 2003/0106654 A1 discloses the use of alkoxylated fatty alcohols and tryglycerides for deinking.

U.S. Pat. Nos. 5,227,019 and 5,225,046 disclose use of alkoxylated fatty alcohols and fatty acids for deinking.

WO 97/32076 discloses deinking using esterified product of alkloxylated fatty alcohols and fatty acids.

WO 96/31646 discloses the use of alkoxylated fatty alcohols for liberating ink.

U.S. Pat. No. 6,312,559 B1 discloses use of cationic compounds during flotation.

U.S. Pat. No. 5,651,861 discloses use of cationic polymers for deinking waste papers.

U.S. published application No. 2002/0066880 A1 discloses use of a mixture comprising a polyester and two subsequent surfactants.

U.S. Pat. No. 5,801,135 discloses liquid blends of fatty acid and surfactants such as alkoxylated fatty alcohols.

U.S. Pat. No. 5,725,730 also discloses use of fatty acids and alkoxylated fatty alcohols.

U.S. Pat. No. 6,251,220 discloses a deinking method for flotation using alkylene oxide, oil, fat and an alcohol.

Because of the different chemical properties of flotation and washing deinking, there is a need for a method and composition for deinking waste paper suitable for both flotation and washing.

There is also a need for a method and composition for deinking waste paper in non-alkaline or neutral conditions.

There is also a need for a method and composition for deinking waste paper with compositions which are liquid at room temperature.

SUMMARY OF THE INVENTION

While alkoxylated fatty alcohols, and more specifically ethoxylated fatty alcohols, have historically been used as deinking additives in wash deinking processes, and fatty acids have historically been used in flotation deinking processes, it has unexpectedly been discovered that the additives can be blended for use in flotation or washing processes with a number of unexpected advantages. Surprisingly, it has been discovered that the blend can remove ink from waste paper in a traditional alkaline deinking process. Surprising, it has also been discovered that the blend can remove ink from waste paper in a non-alkaline or low alkaline slurry. The blend can thus substantially reduce the costs and effort associated with pH adjustment during and after deinking in the paper manufacturing process as well as reduce or eliminate detrimental effects associated with traditional alkaline deinking such as the previously discussed alkaline yellowing or alkaline darkening detriment.

It has also surprisingly been discovered that the blends of alkoxylated fatty alcohols and fatty acids are liquids that furthermore demonstrate non-additive performance attributes even though one or more of the individual components are themselves solid at room temperature. The blends thus promise to substantially reduce the burdens associated with handling solid deinking additives in the papermaking process.

Therefore, in one embodiment there are provided deinking compositions comprising:
a) a first fatty acid that is not alkoxylated and that comprises more than 20 wt % fatty acid having at least 16 carbon atoms and less than 60 wt % of saturated fatty acid having 14 carbons or less;
b) a first alkoxylated fatty alcohol; and
c) optionally a second fatty acid that is alkoxylated.

In another embodiment methods are provided for non-alkaline or low alkaline deinking. Thus, in another embodiment the method for deinking waste paper comprises the steps of:
a) converting the waste paper to a non-alkaline or low alkaline pulp slurry;
b) contacting the pulp slurry with a deinking blend comprising a first alkoxylated fatty alcohol and a first fatty acid; and
c) separating ink from the pulp slurry by washing and/or flotation.

In still another embodiment there are provided flotation methods of deinking. Thus, in yet another embodiment there is provided a method for deinking waste paper comprising the steps of:
a) converting the waste paper to a pulp slurry;
b) contacting the pulp slurry with a deinking blend comprising a first alkoxylated fatty alcohol and a first fatty acid;
c) separating ink from the pulp slurry by flotation; and
d) adding at least one flotation additive during or prior to flotation.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION

Provided are deinking methods and compositions for wastepaper recycling. The compositions include a blend of alkoxylated fatty alcohol and fatty acid.

Definitions

The term "alkyl", as used herein, unless otherwise specified, includes saturated straight, branched, or cyclic, primary, secondary, or tertiary hydrocarbon, e.g. C1 to C20 or C6 to C20, specifically including methyl, ethyl, propyl, isopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, and 2,3-dimethylbutyl. The alkyl group may also include tri-decyl. The alkyl group can be optionally substituted with one or more moieties selected from the group consisting of hydroxyl, carboxy, carboxamido, carboalkoxy, acyl, amino, alkylamino, arylamino, alkoxy, aryloxy, nitro, cyano, sulfonic acid, sulfate, phosphonic acid, phosphate, or phosphonate, either unprotected, or protected as necessary, as known to those skilled in the art, for example, as taught in Greene, et al., "Protective Groups in Organic Synthesis," John Wiley and Sons, Second Edition, 1991, hereby incorporated by reference.

In the text, whenever the term C(alkyl range) is used, the term independently includes each member of that class as if specifically and separately set out. As a nonlimiting example, the term "C1 to C20" independently represents each species that falls within the scope, including, but not limited to, methyl, ethyl, propyl, isopropyl, butyl, sec-butyl, iso-butyl, tert-butyl, pentyl, iso-pentyl, neo-pentyl, cyclopentyl, cyclopentyl, hexyl, 1-methylpentyl, 2-methylpentyl, 3-methylpentyl, 4-methylpentyl, 1-ethylbutyl, 2-ethylbutyl, 3-ethylbutyl, 4-ethyl butyl, cyclohexyl, heptyl, 1-methylhexyl, 2-methylhexyl, 3-methylhexyl, 4-methylhexyl, 5-methylhexyl, 6-methylhexyl, 1-ethylpentyl, 2-ethylpentyl, 3-ethylpentyl, 4-ethylpentyl, 5-ethylpenyl, 1-propylbutyl, 2-propylbutyl, 3-propybutyl, 4-propylbutyl, cycloheptyl, octyl, 1-methylheptyl, 2-methylheptyl, 3-methylheptyl, 4-methylheptyl, 5-methylheptyl, 6-methylheptyl, 7-methylheptyl, 1-ethylhexyl, 2-ethylhexyl, 3-ethylhexyl, 4-ethylhexyl, 5-ethylhexyl, 6-ethylhextyl, 1-propylpentyl, 2-propylpentyl, 3-propypentyl, 4-propylpentyl, 5-propylpentyl, cyclooctyl, nonyl, cyclononyl, decyl, or cyclodecyl.

The term "aryl", as used herein, and unless otherwise specified, refers to phenyl, biphenyl, or naphthyl, and preferably phenyl. The aryl group can be optionally substituted with one or more of the moieties selected from the group consisting of alkyl, heteroaryl, heterocyclic, carbocycle, alkoxy, aryloxy, aryloxy; arylalkoxy; heteroaryloxy; heteroarylalkoxy, carbohydrate, amino acid, amino acid esters, amino acid amides, alditol, halo, haloalkyl, hydroxyl, carboxyl, acyl, acyloxy, amino, amido, alkylamino, dialkylamino, arylamino, nitro, cyano, thiol, imide, sulfonic acid, sulfate, sulfonyl, sulfanyl, sulfinyl, sulfamoyl, carboxylic ester, carboxylic acid, amide, phosphonyl, phosphinyl, phosphoryl, thioester, thioether, oxime, hydrazine, carbamate, phosphonic acid, phosphate, phosphonate, phosphinate, sulfonamido, carboxamide, hydroxamic acid, sulfonylimide or any other desired functional group that does not inhibit the pharmacological activity of this compound, either unprotected, or protected as necessary, as known to those skilled in the art, for example, as taught in Greene, et al., "Protective Groups in Organic Synthesis," John Wiley and Sons, Second Edition, 1991. Alternatively, adjacent groups on the aryl ring may combine to form a 5 to 7 membered carbocyclic, aryl, heteroaryl or heterocyclic ring. In another embodiment, the aryl ring is substituted with an optionally substituted cycloalkyl (such as cyclopentyl or cyclohexyl), or an alkylene dioxy moiety (for example methylenedioxy).

The term "oxyethylene," "ethylene oxide" or "EO" refers to an ethyl moiety attached to an oxygen moiety, or —O—CH$_2$CH$_2$—.

The term "oxypropylene," "propylene oxide," or "PO" refers to a propyl moiety attached to an oxygen moiety, or —O—CH$_2$CHCH$_3$—.

The term "HLB," as used herein, refers to the "hydrophilic-lipophilic balance" of a molecule. The HLB number indicates the polarity of the molecules in an arbitrary range of 1-40, with the most commonly used emulsifiers having a value between 1 and 20. The HLB number increases with increasing hydrophilicity. The HLB system is a semi-empirical method to predict what type of surfactant properties a molecular structure will provide. The HLB system is based on the concept that some molecules have hydrophilic groups, other molecules have lipophilic groups, and some have both. The HLB of a surfactant can be calculated according to Griffin W C: "Classification of Surface-Active Agents by 'HLB,'" *Journal of the Society of Cosmetic Chemists* 1 (1949): 311;

and Griffin W C: "Calculation of HLB Values of Non-Ionic Surfactants," *Journal of the Society of Cosmetic Chemists* 5 (1954): 259.

The term "cationic additive" refers to any compound that is positively charged, or which upon addition to an aqueous medium yields a positively charged ion.

The term "fatty acid" refers to a composition comprising a fatty acid of a uniform molecular weight, or a mixture of fatty acids having a distribution of molecular weights.

The term "fatty alcohol" refers to a composition comprising a fatty alcohol of a uniform molecular weight, or a mixture of fatty alcohols having a distribution of molecular weights.

The term "#/t" represents pound per ton of solids present in slurry. A ton is equivalent to 2000 pounds.

Discussion

In general, there are provided methods of deinking wastepaper pulp, and blends of surfactants that are especially well adapted for practicing such methods. The compositions and methods have use across a spectrum of recycled wastepaper and processing conditions.

A first principal embodiment provides a composition for deinking wastepaper comprising:

a) a first fatty acid that is not alkoxylated and that comprises more than 20 wt % fatty acids having at least 16 carbon atoms and less than 60 wt % of saturated fatty acids having 14 carbons or less;
b) a first alkoxylated fatty alcohol;
c) optionally a second fatty acid that is alkoxylated;
d) optionally a second alkoxylated fatty alcohol; and
e) optionally water, propylene glycol, or another inert diluent.

The blend optionally compriseses:

from about 10 wt. % to about 70 wt. % first fatty acid, from about 20 wt. % to about 60 wt. % first fatty acid, or from about 25 wt. % to about 50 wt. % first fatty acid;

from about 5 wt. % to about 75 wt. % first alkoxylated fatty alcohol, or from about 10 wt. % to about 50 wt. % first alkoxylated fatty alcohol;

from about 0 wt. % to about 35 wt. % second fatty acid, or from about 5 wt. % to about 30 wt. % second fatty acid;

from about 0 wt. % to about 35 wt. % second alkoxylated fatty alcohol, or from about 5 wt. % to about 30 wt. % second alkoxylated fatty alcohol; and/or from about 0 wt. % to about 50 wt. % water or other diluent, or from about 5 wt. % to about 25 wt. % water or other diluent.

The first alkoxylated fatty alcohol optionally is present in relation to the first fatty acid at a weight ratio of from about 1:99 to about 99:1, from about 15:85 to about 55:15, from about 1:3 to about 3:1, from about 1:2 to about 2:1, or from about 1.5:1 to about 1:1.5. Alternatively or in addition, the total alkoxylated fatty alcohol is present in relation to the total fatty acid at a weight ratio of from about 1:99 to about 99:1, from about 15:85 to about 55:15, from about 1:3 to about 3:1, from about 1:2 to about 2:1, or from about 1.5:1 to about 1:1.5.

In various embodiments, the first fatty acid comprises from about 20 wt %, 30 wt %, 40 wt %, 50 wt % or 60 wt %, to about 100%, 90 wt %, 80 wt %, or 70 wt % of fatty acids having from about 16 to about 24 carbon atoms, in any combination of lower and upper percentages. Said fatty acid preferably comprises from about 20 wt %, 30 wt %, 40 wt %, 50 wt % or 60 wt %, to about 100%, 90 wt %, 80 wt %, or 70 wt % of fatty acids having from about 16 to about 18 carbon atoms, in any combination of lower and upper percentages.

The first fatty acid preferably comprises from about 6, 12, or 16 to about 24, 20, or 18 carbon atoms. In addition, the fatty acids within the first fatty acid component may be saturated or unsaturated. In alternative embodiments, the degree of unsaturation of the fatty acids within the first fatty acid component (i.e. the percentage of unsaturated molecules within the first fatty acid component, based upon the total number of fatty acid molecules) is from about 10 to about 95%, from about 20 to about 90%, from about 25 to about 85%, from about 40 to about 90%, or from about 30 to about 80%.

The first alkoxylated fatty alcohol is optionally represented by the following formula:

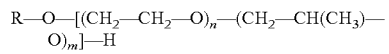

wherein R is aryl or alkyl, e.g., a straight or branched alkyl group;

n is from about 5 to about 45 or about 5 to about 40;

m is from about 0 to about 30 or about 0 to 20; and said —(CH$_2$—CH$_2$—O)— units and said —(CH$_2$—CH(CH$_3$)—O)— units are ordered in block or random format in any order or sequence.

Optionally R is C6-20 alkyl.

Because the ethylene oxide and propylene oxide units are ordered in block or random format in any order or sequence, the n units of ethylene oxide need not be consecutively ordered, and can be interrupted by the m units of propylene oxide in an ordered or random fashion. Moreover, propylene oxide may be directly bound to the fatty alcohol residue instead of ethylene oxide, and the molecule may terminate in ethylene oxide.

In alternative embodiments, R comprises from about 6 to about 24 carbons, from about 6 to about 20 carbons, from about 12 to about 24 carbons, from about 16 to about 20 carbon atoms, or about 18 carbon atoms. Thus, R can be C6-24 alkyl, C6-20 alkyl, C12-24 alkyl, C12-24 alkyl, or C16-20 alkyl. In one embodiment, n is from about 5 to about 40, from about 10 to about 35, about 10 to about 30, about 12 to about 25, about 15 to about 25, or about 21. In alternative embodiments, m is 0 or 1 to about 25 or 20 or 10.

The first alkoxylated fatty alcohol may be saturated or unsaturated. In some embodiments, the degree of unsaturation of the first alkoxylated fatty acid (i.e. the percentage of unsaturated molecules within the first alkoxylated fatty alcohol component) is from about 10 to about 95%, from about 20 to about 90%, from about 25 to about 85%, or from about 30 to about 80%.

In still other embodiments the first alkoxylated fatty alcohol is characterized by HLB. In alternative embodiments, the alkoxylated fatty alcohol has an HLB of greater than 12, 13, 14, 15, or 16.

The second fatty acid of the disclosed formulations is alkoxylated and can thus be represented by the following formula:

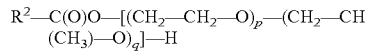

wherein $R^2$ is aryl or a straight or branched alkyl group optionally comprising at least 6, e.g. from about 6 to about 24 carbon atoms, from about 6 to about 20 carbon atoms, from about 12 to about 18 carbon atoms, or from about 16 to about 18 at carbon atoms; p is from about 10 to about 100; q is from about 0 to about 50; and said —(CH$_2$—CH$_2$—O)— units and said —(CH$_2$—CH(CH$_3$)—O)— units are ordered in block or random format in any order or sequence.

$R^2$ is e.g. C6-24 alkyl, C6-20 alkyl, C12-18 alkyl, or C16-18 alkyl.

In alternative embodiments, $R^2$ comprises at least 12, 16 or 18 carbon atoms. Similarly, p may be an integer of from about 10 to about 90, from about 20 to about 80, or from about 25 to about 75, and q may be an integer of from about 5 to about 30. The total average alkoxylation per molecule (i.e. p plus q) may be an integer of from about 15 to about 120, or from about 25 to about 110.

In addition, the second fatty acid may be saturated or unsaturated. In alternative embodiments, the degree of unsaturation of the second fatty acid is from about 10 to about 95%, from about 20 to about 90%, from about 25 to about 85%, or from about 30 to about 80%.

The second alkoxylated fatty alcohol is optionally represented by the following formula:

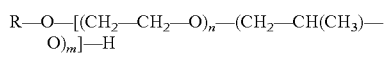

wherein R is aryl or a straight or branched alkyl group;
n is from about 10 to about 100;
m is from about 1 to about 35; and
said —(CH$_2$—CH$_2$—O)— units and said —(CH$_2$—CH(CH$_3$)—O)— units are ordered in block or random format in any order or sequence.

In alternative embodiments, R comprises from about 6 to about 24 carbons, from about 6 to about 20 carbons, from about 12 to about 24 carbons, from about 16 to about 20 carbon atoms, or about 18 carbon atoms. R is optionally C10-40 alkyl, C12-24 alkyl, C16-20 alkyl or C18 alkyl that is optionally straight chained or branched. Similarly, n in alternative embodiments is about 10 to about 100, 50 or 35, about 15 to about 35, 25, or about 2. Optionally, m is 0 or 1 to about 35, 25, 20 or 10.

The second alkoxylated fatty alcohol may be saturated or unsaturated. In alternative embodiments, the degree of unsaturation of the second alkoxylated fatty alcohol is from about 10 to about 95%, from about 20 to about 90%, from about 25 to about 85%, or from about 30 to about 80%.

In another aspect, methods of deinking wastepaper in non-alkaline or low alkaline systems are provided that are not limited to the compositions of the first principal embodiment. Thus, in a second principal embodiment there is provided a method for deinking waste paper comprising the steps of:
a) converting the waste paper to a non-alkaline or low alkaline pulp slurry;
b) contacting the pulp slurry with a deinking blend comprising a first alkoxylated fatty alcohol and a first fatty acid; and
c) separating ink from the pulp slurry by washing and/or flotation.

The first fatty acid is optionally non-alkoxylated.

The first fatty acid is optionally more than 20 wt % fatty acid having at least 16 carbon atoms and less than 60 wt % of saturated fatty acid having 14 carbons or less. The first fatty acid optionally comprises 6 to 20 carbon atoms.

The method may further comprise adding sodium silicate or sodium sulfite or combination thereof to the pulp slurry. The deinking blend optionally further comprises a second alkoxyated fatty alcohol.

Separation of the ink from the pulp slurry is in carried out in one embodiment by flotation. The method may further comprises adding a flotation additive to the slurry before or during separating ink from the pulp slurry.

The method may further comprise adding at least one cationic additive to the slurry before or during the flotation. The cationic additive is optionally a cationic polymer, e.g., a cationic polyamine.

The first alkoxylated fatty alcohol optionally comprises at least 5 moles of ethoxylation. The alcohol portion of the first alkoxylated fatty alcohol optionally comprises 6 to 20 carbon atoms.

In the method, the pulp slurry in step a) optionally has a pH of from about 6.0 to about 8.8; or about 6.8 to about 7.2. The blend is in one embodiment a liquid at a temperature of 22, 25, or 30° C. or greater.

The first alkoxylated fatty alcohol and first fatty acid are optionally present in a ratio of from about 1:99 to about 99:1 by weight; about 15:85 to about 55:15 by weight; or about 1:2 to about 2:1 by weight.

In the method, in one embodiment, the blend comprises total alkoxylated fatty alcohol and fatty acid in a ratio of from about 1:99 to about 99:1 by weight; about 15:85 to about 55:15 by weight; or about 1:2 to about 3:1 by weight.

The blend optionally comprises water or other diluent, e.g., about 0 to about 25 weight % water or other diluent.

Optionally, the first fatty acid is a tall oil fatty acid.

Optionally, the blend further comprises a second fatty acid.

The term "non-alkaline or low alkaline pulp slurry" encompasses slurries ranging from acidic slurries to alkaline slurries in which the alkalinity does not materially contribute to the separation of ink from the fibers in the slurry. In operation, the method may be practiced with slurries having a pH ranging from about 6, 6.5, or 6.7, to about 8.8, 8.0, or 7.3. Most preferably the method will be practiced in a substantially neutral system, such as at a pH of about 6.8 or 7.2.

In another aspect, there are provided methods of deinking wastepaper that employ one or more flotation stages. Thus, in a third principal embodiment there is provided a method for deinking waste paper comprising the steps of:
a) converting the waste paper to a pulp slurry;
b) contacting the pulp slurry with a deinking blend comprising a first alkoxylated fatty alcohol and a first fatty acid, wherein the first fatty acid is optionally non-alkoxylated;
c) separating ink from the pulp slurry by flotation; and
d) adding one flotation additive, such as a cationic additive during or prior to flotation.

Notably, the flotation embodiment and the low-alkaline embodiment are not mutually exclusive. Thus, the flotation embodiment can be practiced in a low alkaline or non-alkaline environment. Similarly, the low alkaline embodiment can be practiced in a flotation based system.

The cationic additive is e.g., a cationic polymer such as a cationic polyamine.

In one subembodiment, the methods are practiced using deinking blends defined by the following parameters:
the first alkoxylated fatty alcohol comprises at least five, ten, or fifteen moles of ethoxylation, and preferably no more than 70 total moles of alkoxylation;
the alcohol portion of the first fatty alcohol comprises from about 6 to about 24, from about 6 to about 20, from about 12 to about 18, or from about 26 to about 18 carbons;
the first fatty acid is a non-alkoxylated C6 to C24, C6-C20, C12-C18, or C16-C18 fatty acid, preferably represented by the formula $R^3$—C(O)OH wherein $R^3$ is a branched or straight chain alkyl of from about 6 to about 24 carbon atoms, from about 9 to about 20 carbon atoms, from about 12 to about 20 carbon atoms, or from about 6 to about 18 carbon atoms.

In another subembodiment, the methods are practiced using blends in which the first fatty acid, second fatty acid, first alkoxylated fatty alcohol, and/or second alkoxylated fatty alcohol are as defined above for the first principal embodiment.

Although the deinking effect can be obtained by using the methods and compositions of the present invention independently, the methods and compositions can be used in combination with conventional deinking additives. Any of these deinking additives may be used as flotation additives or washing additives. They can be added to the pulp slurry during the conversion of waste paper to pulp slurry (i.e. during or before the pulping stage), during the washing or flotation stage, or before (preferably immediately before) the washing or flotation stage.

Non-limiting examples of deinking additives include alcohol sulfates, polyoxyalkylene alcohol sulfates, alkylbenzenesulfonates, fatty acids or salts thereof, adducts of alkylene oxide with alcohol or alkylphenol, adducts of alkylene oxide with fatty acid, adducts of alkylene oxide with mono-, di-, or tri-glyceride, polyhydric or monohydric alcohols or adducts of alkylene oxide with a polyhydric alcohol or monohydric alcohol, silicate and sulfite based additives (non-limiting examples include sodium silicate and sodium sulfite, and the like). The nonlimiting examples of the fatty acids or salts thereof may be fatty acids having 6 to 24 carbon atoms or salts thereof and exemplified by caprylic acid, capric acid, lauric acid, palmitic acid, stearic acid, oleic acid, behenic acid and the like, coconut oil fatty acid, soybean oil fatty acid, rape oil fatty acid, tall oil fatty acid, castor oil fatty acid, tallow oil fatty acid, palm oil fatty acid, fish oil fatty acid and the like containing the above mentioned fatty acids, and fatty acids obtained from natural products of hydrogenated products of the above mentioned fatty acids and synthetic fatty acids. The salts of the fatty acids may be sodium salt or potassium salt. Other non-limiting examples include alpha-olefinsulfonate, ethoxylated lauryl alcohol, propylene glycol, dipropylene glycol, or other substituted glycols.

Non-limiting examples of monohydric alcohols may include those having an alkyl or alkenyl moiety of 8 to 24 carbon atoms and those having an alkylphenyl moiety wherein the alkyl moiety has 6 to 14 carbon atoms. Specific examples thereof include 1-octanol, 1-nonanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol, 1-eicosanol, 1-heneicosanol, 1-docosanol, 1-tricosanol, 1-tetracosanol, 2-octanol, 2-nonanol, 2-decanol, 2-undecanol, 2-dodecanol, 2-tridecanol, 2-tetradecanol, 2-pentadecanol, 2-hexadecanol, 2-heptadecanol, 2-octadecanol, 2-nonadecanol, 2-eicosanol, 2-octen-1-ol, 2-dodecen-1-ol, 2-undecen-1-ol, 2-tetradecen-1-ol, 2-pentadecen-1-ol, 2-hexadecen-1-ol, 2-octadecen-1-ol, 8-nonen-1-ol, 10-undecen-1-ol, 11-dodecen-1-ol, 12-tridecen-1-ol, 15-hexadecen-1-ol, oleyl alcohol, elaidyl alcohol, linoleyl alcohol, linolenyl alcohol, eleostearyl alcohol, ricinoyl alcohol, cyclononanol, cyclodecanol, cycloundecanol, cyclododecanol, cyclotridecanol, cyclotetradecanol, cyclopentadecanol, cyclohexadecanol, cycloheptadecanol, cyclooctadecanol, cyclononadecanol, cycloeicosanol, octylphenol and nonylphenol.

Non-limiting examples of polyhydric alcohols include ethylene glycol, propylene glycol, trimethylene glycol, butylene glycol, 1,6-hexanglycol, 2-ethylbutane-1,2,3-triol, glycerol, trimethylolpropane, trimethylolethane, 1,2,4-butanetriol, 1,2,6-hexanetriol, 1,1,1-trimethylolhexane, tetramethylolcyclohexanols, diglycerol, mannitane, pentaerythritol, erythritol, arabitol, sorbitol, D-glycero-D-galactoheptose, D-glycero-D-glucoheptose, D-glycero-D-mannoheptose, D-glycero-L-mannoheptose, D-altroheptulose, D-mannoheptulose, D-altro-3-heptulose, D-glycero-D-galaheptitol, D-erythro-D-galaoctitol, D-glycero-D-mannooctulose, D-erythlo-L-glononulose, celloblose, maltose, lactose, gentianose, cellotriose and stachyose.

In another embodiment, the additive is a cationic additive, such as a cationic flotation additive. Non-limiting examples of the cationic additives include polymers or monomers. Polymers may be produced via any known methods to those of ordinary skill in the art, such as, radical polymerization of vinyl monomers, or condensation reactions.

Non-limiting examples of cationic additives include cationic polymers including homopolymers, copolymers, tert-polymers and the like. Examples include, but are not limited to, (meth)acrylamide with dimethylaminoethyl methacrylate (DMAEM), dimethylaminoethyl acrylate (DMAEA), diethylaminoethyl acrylate (DEAEA), diethylaminoethyl methacrylate (DEAEM) or their quaternary ammonium forms made with dimethyl sulfate or methyl chloride, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride, Mannich reaction modified polyacrylamides, diallylcyclohexylamine hydrochloride (DACHA HCl), diallyldimethylammonium chloride (DADMAC), polyethylene imine (PEI) or the like.

Water-soluble or water dispersible polymers may be formed by step polymerization of materials such as polydiallyldimethylammonium chloride, alum, polyaluminum chlorides, cationic starch, epichlorohydrin-dimethylamine, ethylenedichloride-ammonia, ethylene-dichloride-methylamine-ammonia, epichlorohydrin-dimethylamine-ethylene oxide-propylene oxide and aniline-formaldehyde reacted with materials such as epichlorohydrin dimethylamine polymers, or any other step polymers which contain epichlorohydrin, dimethylamine, ethylenedichloride, ammonia, methylamine, ethyleneoxide, propyleneoxide, aniline-formaldehyde condensates, or any admixture of the above ingredients, so as to form a polymer which is water-soluble or water-dispersible.

The cationic additive can also be a monomer or molecule such as:

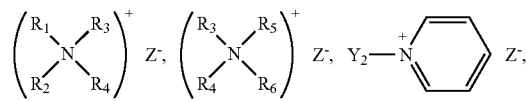

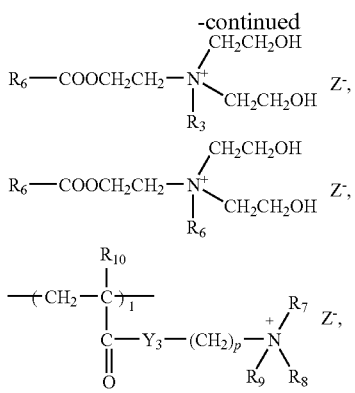

wherein:

R₁ and R₂ are independently alkyl, alkenyl or β-hydroxyalkyl group having 10 to 24 carbon atoms;

R₃, R₄ and R₅ are independently alkyl or hydroxyalkyl group having 1 to 8 carbon atoms, a benzyl group, or a group represented by the formula: -(AO)$_v$-K (wherein AO represents an oxyalkylene group having 2 to 4 carbon atoms, K represents a hydrogen atom or an acyl group, and v is an integer of from 1 to 50);

R₆ represents an alkyl, alkenyl or β-hydroxyalkyl group having 8 to 36 carbon atoms;

Z represents a counter ion;

Y₂ represents an alkyl, alkenyl or β-hydroxyalkyl group having 8 to 36 carbon atoms, a group represented by the formula: R₆COOCH₂-(wherein R₆ is as defined above), a group represented by the formula: R₆CONHCH₂-(wherein R₆ is as defined above) or a group represented by the formula: R₆OCH₂-(wherein R₆ is as defined above);

R₇, R₈, R₉ are independently an alkyl group having 1 to 24 carbon atoms or an alkenyl group having 2 to 24 carbon atoms;

R₁₀ is a hydrogen atom or a methyl group;

Y₃ is O or NH;

When additive(s) are introduced to the system during the pulping stage when practicing the methods of the present invention, the additive(s) are typically added in a range of from about 0.1#/t to about 30#/t which translate to about 0.005 wt % to about 2 wt % based on bone dry solids in the stock (waste paper). Alternatively, the additive(s) can be added in a range of from about 1#/t to about 15#/t which translate to about 0.05 wt % to about 0.75 wt % based on bone dry solids in the stock.

When additive(s) are introduced to the system during or prior to the flotation stage when practicing the methods of the present invention, the additive(s) are typically added in a range of from about 0.05#/t to about 10#/t which translates to about 0.0025 wt % to about 0.5 wt % based on bone dry solids in the stock. Another example of the range of additive(s) that may be added prior or during the flotation stage may be from about 0.2#/t to about 5#/t which translate to about 0.01 wt % to about 0.25 wt % based on bone dry solids in the stock.

The compositions and methods are particularly useful for deinking recycled wastepaper such as old newsprint ("ONP"), old magazine grade ("OMG"), and mixed office waste ("MOW"). The surfactant blend is particularly useful in deinking ONP, OMG, and blends thereof, and is especially useful deinking blends of ONP and OMG wherein the weight ratio of ONP to OMG ranges from about 99:1 to about 1:99, more preferably from about 20:1 to about 3:2.

Exemplary waste papers that can be recycled according to the methods provided include are many non-virgin paper or paper which contains one or contaminants including, but not limited to inks, dye colors, fluorescent whitening agents, and stickies (sticky or tacky contaminants including adhesives, binders, plastic films, coatings, and the like). Waste paper may include, but is not limited to wood containing and wood free grades of paper. Non-limiting examples of waste paper include sorted or unsorted computer printout paper such as from ink jet or laser printers, copying paper, writing paper, fine paper, coated and uncoated magazine paper, mixed office waste, newsprint, packaging board, plastic containing paper and paperboard including but not limited to gable-top milk and juice cartons, aseptic packaging, polyethylene coated, polyester coated or complex layered coatings or laminations including aluminum foil, or scrap from the manufacturing operations for liquid packaging, may be used in the embodiments provided.

The process for recycling paper may be performed by any methods known in the art. Known approaches to processing recycled fibers can be classified as repulping (slushing of fibers and partial detachment of ink/contaminants from fibers), coarse and fine screening (separation of fibers from contaminants by size and shape), centrifugal cleaning (separation based on density differences relative to fibers and reduction in size of ink/contaminants by mechanical action), flotation (separation by preferential adsorption of detached ink/contaminants onto air bubbles), washing (separation of small entrained particles from fibers by relative flow of water passing by fibers) and refining among others. Depending upon the specific cleanliness requirements for the deinked pulp, it takes a combination of most or all of these processes to cover the size range of particles that one typically encounters.

The deinking methods provided can be carried out at any temperature which can facilitate the removal of ink. An example of a suitable temperature range is from about 5° C. to about 70° C. A further example of a suitable temperature range is from about 25° C. to about 65° C. Another example of a suitable temperature range is from 30° C. to about 60° C.

The methods and compositions provided may be used in a conventional pulping stage. During the pulping step, the resulting fibers are contacted with the compositions of the present invention. This contacting step may suitably be carried out by any known pulping equipment, for example, by simply adding deinking agent and to the slurry of the pulper. This may be done either before or after addition of the wastepaper to the pulper. Alternatively, the contact may be carried out using separate processing equipment such as for example, kneaders and dispersers, which provides for agitation of the pulp slurry.

In this invention, the washing step of pulp after deinking is a step of removing minute ink after primary removal of ink from waste papers as raw materials, followed by removal of ink by means of flotation etc. The main deinking methods may be a flotation method and a washing method, and such a washing step may be carried out in each of methods. Although, in the flotation method, the washing step is carried out usually after the flotation step, it is not objectionable that when the general deinking step includes a washing step or concentration step of pulp slurry, the washing step may be carried out in the washing step or concentration step included in the deinking step. For example, this invention is effective in the concentration step after pulping or before kneading or bleaching. In the case where there are plural washing steps or plural concentration steps in the general deinking step, this invention is also effective in either of these plural steps or all the washing steps or concentration steps. This invention may be, applied to the conventional washing method or washing or concentration step. In this invention, the washing step may be carried out by concentrating pulp by removing some of the water by making use of a screen having a proper screen mesh after the pulping or the flotation, or by adding an additional washing water to wash the pulp slurry, by dispersing remaining removed ink in the water and then by removing the washing water in the same manner as mentioned above to concentrate the pulp slurry.

The deinking methods and compositions can also be using in any conventional flotation method. The waste papers as raw materials are put in a dissociating apparatus into which alkaline component bleaching component such as sodium hydroxide, sodium silicate, hydrogen peroxide and the like and water are added to dissociate (dissociation step). If necessary, dehydration (a dehydration step) or chemical mixing is carried out, and aging is carried out. Thereafter, water is added to dilute the concentration of pulp and a flotation treatment is carried out (a flotation step). Kneading steps (dispersing) or a refining step between the aging step and the flotation step may also be carried out. Washing of pulp after the deinking is carried out by concentrating pulp slurry after the flotation by means of a screen having proper screen size (washing step).

In another embodiment the compositions and methods provided are used in a conventional alkaline deinking process. For example, the method of the third principal embodiment, and the compositions of the first principal embodiment, may be used in any pH above 8.0. A non-limiting example of the alkaline pH range may range from about 9 to about 13. A further non-limiting example of an alkaline pH range may be from about 9 to about 11.

The contact time for the wastepaper pulp and the deinking composition is not critical for purposes of this invention. However, a contact time of greater than about 5 minutes is preferred from the standpoint of deinking performance. For purposes of process efficiency, an example of the contact time can be in the range of from about 10 minutes to about one hour. A yet further example of the contact time is in the range of from about 20 minutes to about 50 minutes.

Other embodiments of the invention will be apparent to those skilled in the art from consideration of the specification and practice of the invention disclosed herein. It is intended that the specification and examples be considered as exemplary only, with a true scope and spirit of the invention being further indicated by the following claims.

EXAMPLES

Examples 1-34 were prepared by warming the fatty acid and fatty alcohol components up to about 50° C., adding the appropriate amounts, and vigorously shaking until homogenous. The samples were then allowed to cool and were monitored for stability at 22° C.

Examples 35-48 were prepared by mixing the components at room temperature under agitation from an impeller type mixing apparatus until homogenous. The samples were then allowed to cool and were monitored for stability at 22° C.

Lionsurf 880, Lionsurf 890, and Lionsurf 886 are commercially available from Kemira Chemicals, Inc.

Example 1

A blend containing a.) 38 wt % fatty acid or fatty acid mixture wherein about 85 wt % of the composition is between C16 and C18 and with on average about 75 wt % unsaturated fatty acids, b.) 47 wt % of an alkoxylated linear alcohol where the base fatty alcohol predominantly contains about C18 or greater with an average of 21 moles of oxyethylene per molecule of fatty alcohol, and c.) 15 wt % of water.

Example 2

A blend containing a.) 38% fatty acid or fatty acid mixture wherein about 60 wt % of the composition is between C16 and C18 and with on average about 35 wt % unsaturated fatty acids, c.) 47 wt % of an alkoxylated linear alcohol where the base fatty alcohol predominantly contains about C18 or greater with an average of 21 moles of oxyethylene per molecule of fatty alcohol, and d.) 15 wt % of water.

Example 3

A blend containing a.) 38% fatty acid or fatty acid mixture wherein about 66 wt % of the composition is between C16 and C18 and with on average about 45 wt % unsaturated fatty acids, b.) 47 wt % of an alkoxylated linear alcohol where the base fatty alcohol predominantly contains about C18 or greater with an average of 21 moles of oxyethylene per molecule of fatty alcohol, and c.) 15 wt % of water.

Example 4

A blend containing a.) 38% fatty acid or fatty acid mixture wherein about 72 wt % of the composition is between C16 and C18 and with on average about 55 wt % unsaturated fatty acids, b.) 47 wt % of an alkoxylated linear alcohol where the base fatty alcohol predominantly contains about C18 or greater with an average of 21 moles of oxyethylene per molecule of fatty alcohol, and c.) 15 wt % of water.

Example 5

A blend containing a.) 38% fatty acid or fatty acid mixture wherein about 77 wt % of the composition is between C16 and C18 and with on average about 65 wt % unsaturated fatty acids, b.) 47 wt % of an alkoxylated linear alcohol where the base fatty alcohol predominantly contains about C18 or greater with an average of 21 moles of oxyethylene per molecule of fatty alcohol, and c.) 15 wt % of water.

Example 6

A blend containing a.) 37 wt % fatty acid or fatty acid mixture wherein about 85 wt % of the composition is between C16 and C18 and with on average about 75 wt % unsaturated fatty acids, b.) 37 wt % of an alkoxylated linear alcohol where the base fatty alcohol predominantly contains about C18 or greater with an average of 21 moles of oxyethylene per molecule of fatty alcohol, c.) 10 wt % of an alkoxylated tall oil fatty acid having on average 25 moles of oxyethylene and on average 20 moles of PO, and d.) 16 wt % of water.

Example 7

A blend containing a.) 50 wt % fatty acid or fatty acid mixture wherein about 85 wt % of the composition is between C16 and C18 and with on average about 75 wt % unsaturated fatty acids, b.) 17 wt % of an alkoxylated linear alcohol where the base fatty alcohol predominantly contains about C18 or greater with an average of 21 moles of oxyethylene per molecule of fatty alcohol, c.) 17 wt % of an alkoxylated tall oil fatty acid having on average 25 moles of oxyethylene and on average 20 moles of PO, and d.) 16 wt % of water.

Example 8

A blend containing a.) 37 wt % fatty acid or fatty acid mixture wherein about 85 wt % of the composition is between C16 and C18 and with on average about 75 wt % unsaturated fatty acids, b.) 23.5 wt % of an alkoxylated linear alcohol where the base fatty alcohol predominantly contains about C18 or greater with an average of 21 moles of oxyethylene per molecule of fatty alcohol, c.) 23.5 wt % of an alkoxylated tall oil fatty acid having on average 25 moles of oxyethylene and on average 20 moles of PO, and d.) 16 wt % of water.

Example 9

A blend containing a.) 37 wt % fatty acid or fatty acid mixture wherein about 85 wt % of the composition is between C16 and C18 and with on average about 75 wt % unsaturated fatty acids, b.) 17 wt % of an alkoxylated linear alcohol where the base fatty alcohol predominantly contains about C18 or greater with an average of 21 moles of oxyethylene per molecule of fatty alcohol, c.) 30 wt % of an alkoxylated tall oil fatty acid having on average 25 moles of oxyethylene and on average 20 moles of PO, and d.) 16 wt % of water.

Example 10

A blend containing a.) 32 wt % fatty acid or fatty acid mixture wherein about 85 wt % of the composition is between C16 and C18 and with an average about 75 wt % unsaturated fatty acids, b.) 37 wt % of an alkoxylated linear alcohol where the base fatty alcohol predominantly contains about C18 or greater with an average of 21 moles of oxyethylene per molecule of fatty alcohol, c.) 15 wt % of an alkoxylated tall oil fatty acid having on average 25 moles of oxyethylene and on average 20 moles of PO, and d.) 16 wt % of water.

Example 11

A blend containing a.) 37 wt % fatty acid or fatty acid mixture wherein about 85 wt % of the composition is between C16 and C18 and with on average about 75 wt % unsaturated fatty acids, b.) 37 wt % of an alkoxylated linear alcohol where the base fatty alcohol predominantly contains about C18 or greater with an average of 21 moles of oxyethylene per molecule of fatty alcohol, c.) 10 wt % of an alkoxylated C18 fatty alcohol having on average 72 moles of oxyethylene and on average 24 moles of PO, and d.) 16 wt % of water.

Example 12

A blend containing a.) 37 wt % fatty acid or fatty acid mixture wherein about 85 wt % of the composition is between C16 and C18 and with on average about 75 wt % unsaturated fatty acids, b.) 30 wt % of an alkoxylated linear alcohol where the base fatty alcohol predominantly contains about C18 or greater with an average of 21 moles of oxyethylene per molecule of fatty alcohol, c.) 17 wt % of an alkoxylated C18 fatty alcohol having on average 72 moles of oxyethylene and on average 24 moles of PO, and d.) 16 wt % of water.

Example 13

A blend containing a.) 37% fatty acid or fatty acid mixture wherein about 85 wt % of the composition is between C16 and C18 and with on average about 75 wt % unsaturated fatty acids, b.) 25 wt % of an alkoxylated linear alcohol where the base fatty alcohol predominantly contains about C18 or greater with an average of 21 moles of oxyethylene per molecule of fatty alcohol, c.) 22 wt % of an alkoxylated C18 fatty alcohol having on average 72 moles of oxyethylene and on average 24 moles of PO, and d.) 16 wt % of water.

Example 14

A blend containing a.) 32% fatty acid or fatty acid mixture wherein about 85 wt % of the composition is between C16 and C18 and with on average about 75 wt % unsaturated fatty acids, b.) 37 wt % of an alkoxylated linear alcohol where the base fatty alcohol predominantly contains about C18 or greater with an average of 21 moles of oxyethylene per molecule of fatty alcohol, c.) 15 wt % of an alkoxylated C18 fatty alcohol having on average 72 moles of oxyethylene and on average 24 moles of PO, and d.) 16 wt % of water.

Example 15

A blend containing a.) 38 wt % fatty acid or fatty acid mixture wherein about 60 wt % of the composition is between C16 and C18 and with on average about 75 wt % unsaturated fatty acids, b.) 37 wt % of an alkoxylated linear alcohol where the base fatty alcohol predominantly contains about C18 or greater with an average of 21 moles of oxyethylene per molecule of fatty alcohol, c.) 10 wt % of an alkoxylated C18 fatty alcohol having on average 72 moles of oxyethylene and on average 24 moles of PO, and d.) 16 wt % of water.

Example 16

A blend containing a.) 38 wt % fatty acid or fatty acid mixture wherein about 60 wt % of the composition is between C16 and C18 and with on average about 75 wt % unsaturated fatty acids, b.) 37 wt % of an alkoxylated linear alcohol where the base fatty alcohol predominantly contains about C18 or greater with an average of 21 moles of oxyethylene per molecule of fatty alcohol, c.) 10 wt % of an alkoxylated tall oil fatty acid having on average 25 moles of oxyethylene and on average 20 moles of PO, and d.) 16 wt % of water.

Example 17

An exemplary flotation additive is a blend containing a.) 90 wt % of an alkoxylated C18 fatty alcohol having on average 72 moles of oxyethylene and on average 24 moles of PO, and d.) 10 wt % of water.

Example 18

An exemplary flotation additive is a blend containing a.) 90 wt % of an alkoxylated tall oil fatty acid having on average 25 moles of oxyethylene and on average 20 moles of PO, and d.) 10 wt % of water.

Example 19

A blend containing a.) 38 wt % fatty acid or fatty acid mixture wherein about 85 wt % of the composition is between C16 and C18 and with on average about 75 wt % unsaturated fatty acids, b.) 47 wt % of an alkoxylated linear alcohol where the base fatty alcohol predominantly contains about C18 or greater with an average of 10 moles of oxyethylene per molecule of fatty alcohol, and c.) 15 wt % of water.

Example 20

A blend containing a.) 38 wt % fatty acid or fatty acid mixture wherein about 85 wt % of the composition is between C16 and C18 and with on average about 75 wt % unsaturated fatty acids, b.) 47 wt % of an alkoxylated linear alcohol where the base fatty alcohol predominantly contains about C18 or greater with an average of 15 moles of oxyethylene per molecule of fatty alcohol, and c.) 15 wt % of water.

Example 21

A blend containing a.) 38 wt % fatty acid or fatty acid mixture wherein about 85 wt % of the composition is between C16 and C18 and with on average about 75 wt % unsaturated fatty acids, b.) 47 wt % of an alkoxylated linear alcohol where the base fatty alcohol predominantly contains about C18 or greater with an average of 30 moles of oxyethylene per molecule of fatty alcohol, and c.) 15 wt % of water.

Example 22

A blend containing a.) 38 wt % fatty acid or fatty acid mixture wherein about 85 wt % of the composition is between C16 and C18 and with on average about 75 wt % unsaturated fatty acids, b.) 47 wt % of an alkoxylated linear alcohol where the base fatty alcohol predominantly contains about C18 or greater with an average of 40 moles of oxyethylene per molecule of fatty alcohol, and c.) 15 wt % of water.

Example 23

A blend containing a.) 38 wt % fatty acid or fatty acid mixture wherein about 85 wt % of the composition is between C16 and C18 and with on average about 75 wt % unsaturated fatty acids, b.) 47 wt % of an alkoxylated linear alcohol where the base fatty alcohol predominantly contains C18 or greater with an average of 10 moles of oxyethylene per molecule of fatty alcohol, and c.) 15 wt % of water.

Example 24

A blend containing a.) 38 wt % fatty acid or fatty acid mixture wherein about 85 wt % of the composition is between C16 and C18 and with on average about 75 wt % unsaturated fatty acids, b.) 47 wt % of an alkoxylated linear alcohol where the base fatty alcohol predominantly contains about C18 or greater with an average of 20 moles of oxyethylene per molecule of fatty alcohol, and c.) 15 wt % of water.

Example 25

A blend containing a.) 38 wt % fatty acid or fatty acid mixture wherein about 85 wt % of the composition is between C16 and C18 and with on average about 75 wt % unsaturated fatty acids, b.) 47 wt % of an alkoxylated linear alcohol where the base fatty alcohol predominantly contains about C16 an average of 20 moles of oxyethylene per molecule of fatty alcohol, and c.) 15 wt % of water.

Example 26

A blend containing a.) 38 wt % fatty acid or fatty acid mixture wherein about 85 wt % of the composition is between C16 and C18 and with on average about 75 wt % unsaturated fatty acids, b.) 47 wt % of an alkoxylated linear alcohol where the base fatty alcohol predominantly contains about C12-14 with an average of 9 moles of oxyethylene per molecule of fatty alcohol, and c.) 15 wt % of water.

Example 27

A blend containing a.) 38 wt % fatty acid or fatty acid mixture wherein about 85 wt % of the composition is between C16 and C18 and with on average about 75 wt % unsaturated fatty acids, b.) 47 wt % of an alkoxylated linear alcohol where the base fatty alcohol predominantly contains about C12-14 with an average of 12 moles of oxyethylene per molecule of fatty alcohol, and c.) 15 wt % of water.

Example 28

A blend containing a.) 38 wt % fatty acid or fatty acid mixture wherein about 85 wt % of the composition is between C16 and C18 and with on average about 75 wt % unsaturated fatty acids, b.) 47 wt % of an alkoxylated linear alcohol where the base fatty alcohol predominantly contains about C12-14 with an average of 17 moles of oxyethylene per molecule of fatty alcohol, and c.) 15 wt % of water.

Example 29

A blend containing a.) 38 wt % fatty acid or fatty acid mixture wherein about 85 wt % of the composition is between C16 and C18 and with on average about 75 wt % unsaturated fatty acids, b.) 47 wt % of an alkoxylated linear alcohol where the base fatty alcohol predominantly contains about C12-14 with an average of 22 moles of oxyethylene per molecule of fatty alcohol, and c.) 15 wt % of water.

Example 30

A blend containing a.) 38 wt % fatty acid or fatty acid mixture wherein about 85 wt % of the composition is between C16 and C18 and with on average about 75 wt % unsaturated fatty acids, b.) 47 wt % of an alkoxylated linear alcohol where the base fatty alcohol predominantly contains about C12-14 with an average of 30 moles of oxyethylene per molecule of fatty alcohol, and c.) 15 wt % of water.

Example 31

A blend containing a.) 38 wt % fatty acid or fatty acid mixture wherein about 85 wt % of the composition is between C16 and C18 and with on average about 75 wt % unsaturated fatty acids, b.) 47 wt % of an alkoxylated linear alcohol where the base fatty alcohol predominantly contains about C12-14 with an average of 40 moles of oxyethylene per molecule of fatty alcohol, and c.) 15 wt % of water.

Example 32

A blend containing a.) 38 wt % fatty acid or fatty acid mixture wherein about 85 wt % of the composition is between C16 and C18 and with on average about 75 wt % unsaturated fatty acids, b.) 47 wt % of an alkoxylated branched alcohol where the base fatty alcohol predominantly contains the tridecyl unit with an average of 4 moles of oxyethylene per molecule of fatty alcohol, and c.) 15 wt % of water.

Example 33

A blend containing a.) 38 wt % fatty acid or fatty acid mixture wherein about 85 wt % of the composition is between C16 and C18 and with on average about 75 wt % unsaturated fatty acids, b.) 47 wt % of an alkoxylated branched alcohol where the base fatty alcohol predominantly contains the tridecyl unit with an average of 9 moles of oxyethylene per molecule of fatty alcohol, and c.) 15 wt % of water.

Example 34

A blend containing a.) 38 wt % fatty acid or fatty acid mixture wherein about 85 wt % of the composition is between C16 and C18 and with on average about 75 wt % unsaturated fatty acids, b.) 47 wt % of an alkoxylated branched alcohol where the base fatty alcohol predominantly contains the tridecyl unit with an average of 15 moles of oxyethylene per molecule of fatty alcohol, and c.) 15 wt % of water.

Example 35

An exemplary flotation additive is a blend containing a.) 10 wt % of a low molecular weight high cationic charge density polymer prepared from the condensation of epichlorohydrine and dimethylamine, b.) 12 wt % of an alkoxylated tall oil fatty acid having on average 25 moles of oxyethylene and on average 20 moles of PO, c.) 16 wt % of an alkoxylated castor oil having 60 moles of oxyethylene on average and 20 moles of oxypropylene on average, d.) 62 wt % of water.

Example 36

An exemplary flotation additive is a blend containing a.) 5 wt % of a low molecular weight high cationic charge density polymer prepared from the condensation of epichlorohydrine and dimethylamine, b.) 15 wt % of an alkoxylated tall oil fatty acid having on average 25 moles of oxyethylene and on average 20 moles of PO, c.) 18 wt % of an alkoxylated castor oil having 60 moles of oxyethylene on average and 20 moles of oxypropylene on average, d.) 62 wt % of water.

Example 37

An exemplary flotation additive is a blend containing a.) 15 wt % of a low molecular weight high cationic charge density polymer prepared from the condensation of epichlorohydrine and dimethylamine, b.) 12 wt % of an alkoxylated tall oil fatty acid having on average 25 moles of oxyethylene and on average 20 moles of PO, c.) 16 wt % of an alkoxylated castor oil having 60 moles of oxyethylene on average and 20 moles of oxypropylene on average, d.) 57 wt % of water.

Example 38

An exemplary flotation additive is a blend containing a.) 30 wt % of an alkoxylated tall oil fatty acid having on average 25 moles of oxyethylene and on average 20 moles of oxypropylene and b.) 70 wt % of water.

Example 39

An exemplary flotation additive is a blend containing a.) 38 wt % of an alkoxylated tall oil fatty acid having on average 25 moles of oxyethylene and on average 20 moles of oxypropylene and b.) 62 wt % of water.

Example 40

An exemplary flotation additive is a blend containing a.) 15 wt % of a low molecular weight high cationic charge density polymer prepared from the condensation of epichlorohydrine and dimethylamine, b.) 30 wt % of an alkoxylated tall oil fatty acid having on average 25 moles of oxyethylene and on average 20 moles of PO, and c.) 55 wt % of water.

Example 41

An exemplary flotation additive is a blend containing a.) 25 wt % of alpha-olefinsulfonate, b). 25 wt % of ethoxylated lauryl alcohol with an average of 3 units of EO, c.) 25 wt % of a low molecular weight high cationic charge density polymer prepared from the condensation of epichlorohydrine and dimethylamine, and d.) 25 wt % propylene glycol.

Example 42

An exemplary flotation additive is a blend containing a.) 25 wt % of alpha-olefinsulfonate, b). 25 wt % of ethoxylated lauryl alcohol with an average of 3 units of EO, c.) 25% fatty acid or fatty acid mixture wherein about 85 wt % of the composition is between C16 and C18 and with on average about 75 wt % unsaturated fatty acids, and d.) 25 wt % propylene glycol.

Example 43

An exemplary flotation additive is a blend containing a.) 25 wt % of sodium lauryl sulfate, b). 25 wt % of ethoxylated lauryl alcohol with an average of 3 units of EO, c.) 25 wt % of a low molecular weight high cationic charge density polymer prepared from the condensation of epichlorohydrine and dimethylamine, and d.) 25 wt % propylene glycol.

Example 44

An exemplary flotation additive is a blend containing a.) 27 wt % of alpha-olefinsulfonate, b). 27 wt % of ethoxylated lauryl alcohol with an average of 3 units of EO, c.) 27 wt % of a low molecular weight high cationic charge density polymer prepared from the condensation of epichlorohydrine and dimethylamine, and d.) 19 wt % dipropylene glycol.

Example 45

An exemplary flotation additive is a blend containing a.) 31 wt % of a low molecular weight high cationic charge density polymer prepared from the condensation of epichlorohydrine and dimethylamine, b.) 12 wt % of an alkoxylated tall oil fatty acid having on average 25 moles of oxyethylene and on average 20 moles of PO, and c.) 57 wt % of water.

Example 46

An exemplary flotation additive is a blend containing a.) 23 wt % of a low molecular weight high cationic charge density polymer prepared from the condensation of epichlorohydrine and dimethylamine, b.) 20 wt % of an alkoxylated tall oil fatty acid having on average 25 moles of oxyethylene and on average 20 moles of PO, and c.) 57 wt % of water.

Example 47

An exemplary flotation additive is a blend containing a.) 23 wt % of a low molecular weight high cationic charge density polymer prepared from the condensation of epichlorohydrine and dimethylamine, b.) 12 wt % of an alkoxylated tall oil fatty acid having on average 25 moles of oxyethylene and on average 20 moles of PO, and c.) 65 wt % of water.

Example 48

An alkoxylated linear alcohol where the base fatty alcohol predominantly contains about C18 or greater with an average of 21 moles of oxyethylene per molecule of fatty alcohol.

Prior Art Formulations as a Comparative Example

Comparative examples 1-4 were prepared by warning the fatty acid and fatty alcohol components up to about 50° C., adding the appropriate amounts, and vigorously shaking until homogenous. The samples were then allowed to cool and were monitored for stability at 22° C.

Comparative examples 5-7 were heated to about 55° C. and then formed into a 5 wt % solution using water at 55° C. for testing purposes.

Comparative Example 1

A blend containing a.) 20 wt % fatty acid or fatty acid mixture wherein about 67 wt % of the composition is between C12 and C14 and less than 20 wt % fatty acids C16 or greater with an average of less than about 6 wt % unsaturated fatty acids, b.) 70 wt % of an ethoxylated linear alcohol where the base fatty alcohol predominately contains about C18 with and average of 40 moles of oxyethylene per molecule of fatty alcohol, and c.) 10 wt % of water.

Comparative Example 2

A blend containing a.) 20 wt % fatty acid or fatty acid mixture wherein about 67 wt % of the composition is between C12 and C14 and less than 20 wt % fatty acids C16 or greater with an average of less than about 6 wt % unsaturated fatty acids, b.) 70 wt % of an ethoxylated linear alcohol where the base fatty alcohol predominantly contains about C18 with an average of 21 moles of oxyethylene per molecule of fatty alcohol, and c.) 10 wt % of water.

Comparative Example 3

A blend containing a.) 20 wt % fatty acid or fatty acid mixture wherein about 67 wt % of the composition is between C12 and C14 and less than 20 wt % fatty acids C16 or greater with an average of less than about 6 wt % unsaturated fatty acids, b.) 70 wt % of an alkoxylated fatty alcohol composed of greater than 80 wt % C18 with on average 17 moles of oxyethylene and on average 17 moles of oxypropylene per fatty alcohol molecule, and c.) 10 wt % of water.

Comparative Example 4

A blend containing a.) 38% fatty acid or fatty acid mixture wherein about 60 wt % of the composition is between C16 and C18 and with on average about 35 wt % unsaturated fatty acids, b.) 47 wt % of an alkoxylated fatty alcohol composed of greater than 80 wt % C18 with on average 17 moles of oxyethylene and on average 17 moles of oxypropylene per fatty alcohol molecule, and c.) 15 wt % of water.

Comparative Example 5

A fatty acid composed of 80 wt % C18 or greater with about 80 wt % of the fatty acid being saturated.

Comparative Example 6

A fatty acid blend composed of 85 wt % C18 or greater with 55 wt % unsaturated fatty acids.

Comparative Example 7

A fatty acid composed of 60 wt % C18 or greater with 25 wt % unsaturated fatty acids.

A. Stability

The results of these stability tests were recorded after 1 week and are shown in Table 1.

TABLE 1

| Stability/Sample State at 1 week | |
|---|---|
| Example #/t | |
| 1 | Liquid |
| 2 | Liquid |
| 3 | Liquid |
| 4 | Liquid |
| 5 | Liquid |
| 6 | Liquid |
| 7 | Liquid |
| 8 | Liquid |
| 9 | Liquid |
| 10 | Liquid |
| 11 | Liquid |
| 12 | Liquid |
| 13 | Liquid |
| 14 | Liquid |
| 15 | Liquid |
| 16 | Liquid |
| 17 | Liquid |
| 18 | Liquid |
| 19 | Clear and Gelatinous |
| 20 | Liquid |
| 21 | Liquid |
| 22 | Liquid above 27° C. and Cloudy below 27° C. |
| 23 | Liquid |
| 24 | Liquid |
| 25 | Liquid |
| 26 | Liquid |
| 27 | Liquid |
| 28 | Liquid |
| 29 | Liquid |
| 30 | Liquid |
| 31 | Liquid |
| 32 | Liquid |
| 33 | Liquid |
| 34 | Liquid |
| 35 | Liquid |
| 36 | Liquid |
| 37 | Liquid |
| 38 | Liquid |
| 39 | Liquid |
| 40 | Liquid |
| 41 | Liquid |
| 42 | Liquid |
| 43 | Liquid |
| 44 | Liquid |
| 45 | Liquid |
| 46 | Liquid |
| 47 | Liquid |
| Prior Art Example #/t | |
| 1 | Solid |
| 2 | Solid |
| 3 | Liquid |
| 4 | Solid |

B. Deinking Performance

All samples were prepared for testing by making a 5 wt % solution in 25° C. water and shaking vigorously prior to use.

Wastepaper is shredded and mixed uniformly to ensure each experimental run has a consistent wastepaper feed. The shredded wastepaper is placed in a pulper and water at a specified temperature is added to obtain a 5 wt % consistency. As appropriate other additives are added to the pulper prior to pulping. These additives can include but are not limited to deinking aids, sodium silicate, chelant, calcium chloride, and peroxide. A pulping period of 7 minutes is allowed and then the stock can be prepared for either washing or flotation deinking. The desired amount of water at a specified temperature is added to obtain the desired consistency.

In the case of flotation deinking, a Wemco cell is used and the pulp is deinked for a specified time. The resulting flotation accepts are then used to make brightness pads of 3 grams by filtering thru a buchner filter containing a filter paper such as Whatman #/t40 that is attached to the house vacuum. In some cases the flotation rejects are measured both in the wet and dry form. The dried brightness pads are then evaluated for brightness and ERIC using a Technibrite Micro TB-1C.

In the case of wash deinking, the pulp is diluted to a desired consistency using water at a specified temperature. The resulting pulp is then gravity drained thru a mesh screen of 60M to increase the consistency back to 6 wt % by removing the appropriate amount of water. This process is iteratively repeated as needed to simulate progressive washing stages. The resulting washing accepts are then reconstituted using heated water to 1 wt % consistency and used to make brightness pads of 3 grams by filtering thru a buchner filter containing a filter paper such as Whatman #/t40 that is attached to the house vacuum. The dried brightness pads are then evaluated for brightness and ERIC using a Technibrite Micro TB-1C.

C. Alkaline Deinking

Pulping was performed using wastepaper received from a mill in the United States. Pulping details are as previously described to prepare an 83 wt % ONP and 17 wt % OMG furnish. Dosages of additives are given as pounds of material per bone dry weight of furnish solids. This conventional alkaline pulping occurred following additions of 1.3 #/t DTPA, 30 #/t peroxide, 31 #/t silicate, and sufficient caustic to supply a pulping pH of 9. Hardness was adjusted using calcium chloride to 180 ppm before both the pulping and the flotation stages. The temperature during pulping and flotation was 110° F. Flotation was for 2 minutes in the Wemco cell at 1 wt % consistency. The location of the addition, prior to pulping or prior to flotation, are denoted in Table 2 which contains the data from this work.

TABLE 2

| | Float Accepts | |
|---|---|---|
| | Bright | ERIC |
| 7.5#/t Lionsurf 880 (Pulp) | 50.2 | 516 |
| 6 #/t Example 6 (Pulp) | 50.5 | 480 |
| 6 #/t Example 6 (Pulp)/1.5#/t Example 41(Float) | 51.7 | 438 |

D. Neutral Deinking

Pulping was performed using wastepaper received from a mill in the United States. Pulping details are as previously described to prepare an 83 wt % ONP and 17 wt % OMG furnish using only water and calcium chloride to a desired hardness. The resulting pH was 7.1 as measured. Hardness was adjusted using calcium chloride to 180 ppm before both the pulping and the flotation stages. The temperature during pulping and flotation was 110° F. Flotation was for 2 minutes in the Wemco cell at 1 wt % consistency. The location of the addition, prior to pulping or prior to flotation, are denoted in Table 3 which contains the data from this work. The first entry is a comparative example performed under the traditional alkaline conditions of 1.3 #/t DTPA, 30 #/t peroxide, 31 #/t silicate, and sufficient caustic to supply a pulping pH of 9 exactly as in the previous data table.

TABLE 3

| | Float Accepts | |
|---|---|---|
| | Bright | ERIC |
| 7.5#/t Lionsurf 880 (Pulp) -pH 9.0 | 50.2 | 516 |
| 7.5#/t Lionsurf 880 (Pulp) (Pulp) -pH 7.1 | 48.6 | 573 |
| 6 #/t Example 1 (Pulp) | 49.2 | 533 |
| 6 #/t Example 1(Pulp)/1.5#/t Example 41(Float) | 50.5 | 433 |
| 6 #/t Example 6 (Pulp) | 49.3 | 534 |
| 6 #/t Example 6(Pulp)/1.5#/t Example 41(Float) | 50.8 | 434 |
| 6 #/t Example 11 (Pulp) | 49.9 | 506 |
| 6 #/t Example 11(Pulp)/1.5#/t Example 41(Float) | 51.0 | 421 |

E. Neutral Deinking

Pulping was performed using wastepaper collected in the United States. Pulping details are as previously described to prepare an 83 wt % ONP and 17 wt % OMG furnish using only water and calcium chloride to a desired hardness. The resulting pH was 7.1 as measured. Hardness was adjusted using calcium chloride to 180 ppm before both the pulping and the flotation stages. The temperature during pulping and flotation was 110° F. Flotation was for 2 minutes in the Wemco cell at 1 wt % consistency. The location of the addition, prior to pulping or prior to flotation, are denoted in Table 4 which contains the data from this work.

TABLE 4

| | Float Accepts | |
|---|---|---|
| | Bright | ERIC |
| 7.5#/t Lionsurf 880 (Pulp) (Pulp) -pH 9.0 | 54.0 | 369 |
| 7.5#/t Lionsurf 880 (Pulp) (Pulp) -pH 7.1 | 51.8 | 420 |
| 6 #/t Example 6 (Pulp) | 53.0 | 367 |
| 6 #/t Example 6(Pulp)/1.5#/t Example 41(Float) | 53.5 | 335 |
| 6 #/t Example 7 (Pulp) | 50.9 | 457 |
| 6 #/t Example 7(Pulp)/1.5#/t Example 41(Float) | 52.5 | 384 |
| 6 #/t Example 8 (Pulp) | 52.7 | 392 |
| 6 #/t Example 8 (Pulp)/1.5#/t Example 41(Float) | 53.5 | 341 |
| 6 #/t Example 9 (Pulp) | 52.4 | 413 |
| 6 #/t Example 9(Pulp)/1.5#/t Example 41(Float) | 52.9 | 372 |
| 6 #/t Example 11 (Pulp) | 52.5 | 395 |
| 6 #/t Example 11(Pulp)/1.5#/t Example 41(Float) | 54.0 | 322 |
| 6 #/t Example 12 (Pulp) | 52.4 | 414 |
| 6 #/t Example 12(Pulp)/1.5#/t Example 41(Float) | 53.4 | 357 |
| 6 #/t Example 13 (Pulp) | 52.0 | 415 |
| 6 #/t Example 13(Pulp)/1.5#/t Example 41(Float) | 53.2 | 346 |

F. Low-Alkali Deinking

Low-Alkali pulping was performed using wastepaper received from a mill in Canada. Pulping details are as previously described to prepare an 75 wt % ONP and 25 wt %

OMG furnish using heated water and 15#/t sodium silicate and 20#/t of sodium sulfite. Hardness was adjusted using calcium chloride to 160 ppm before both the pulping and the flotation stages. The temperature during pulping and flotation was 45° C. Flotation was for 2 minutes in the Wemco cell at 1.2 wt % consistency. The location of the addition, prior to pulping or prior to flotation, are denoted in Table 5 which contains the data from this work. The alkaline control uses 20 #/t sodium silicate, 33 #/t hydrogen peroxide, and sufficient sodium hydroxide to bring the pulping pH to 10.3 in place of the sodium silicate and sodium sulfite used for the low-alkali treatment scenario. All runs have 15#/t of comparative example 5 added to the pulper.

TABLE 5

| | Float Accepts | |
| --- | --- | --- |
| | Bright | ERIC |
| Conventional Alkaline | 51.5 | 390 |
| Low-alkali | 48.9 | 484 |
| Low-alkali with 3#/t Example 18 (Float) | 53.0 | 367 |
| Low-alkali with 3#/t Example 41 (Float) | 51.3 | 365 |
| Low-alkali with 3#/t Example 11 (Pulp) | 54.3 | 241 |

G. Alkaline Deinking

Pulping was performed using wastepaper received from a mill in Canada. Pulping details are as previously described to prepare an 75 wt % ONP and 25 wt % OMG furnish using heated water and 20 #/t sodium silicate, 33 #/t hydrogen peroxide, and sufficient sodium hydroxide to bring the pulping pH to 10.3 as measured. Hardness was adjusted using calcium chloride to 160 ppm before both the pulping and the flotation stages. The temperature during pulping and flotation was 45° C. Flotation was for 2 minutes in the Wemco cell at 1.2 wt % consistency. The location of the addition, prior to pulping or prior to flotation, are denoted in Table 6 which contains the data from this work. All runs have 15#/t of comparative example 5 added to the pulper.

TABLE 6

| | Float Accepts | |
| --- | --- | --- |
| | Bright | ERIC |
| Conventional Alkaline | 51.5 | 390 |
| 7.5#/t Example 2 (Pulp) and 2.5#/t Example 18 (Float) | 52.1 | 440 |

H. Alkaline Deinking

Pulping was performed using wastepaper received from a mill in the United States. Pulping details are as previously described to prepare an 70 wt % ONP and 30 wt % OMG furnish using heated water and 20 #/t silicate, 20 #/t of peroxide, DTPA at 4#/t, and sufficient caustic to obtain a pH during pulping of 9.2 as measured. Hardness was a naturally occurring 40 ppm during these tests. The temperature during pulping and flotation was 100° F. Flotation was for 2 minutes in the Wemco cell at 1.3 wt % consistency. The location of the addition, prior to pulping or prior to flotation, are denoted in Table 7 which contains the data from this work. The control run uses 6#/t of Lionsurf 886 to the pulper.

TABLE 7

| | Float Accepts | |
| --- | --- | --- |
| | Bright | ERIC |
| 6#/t Lionsurf 886 (Pulp) | 50.8 | 459 |
| 7#/t Example 11 (Pulp) | 52.4 | 386 |
| 7#/t Example 10 (Pulp) | 52.3 | 412 |
| 7#/t Example 4 (Pulp) | 51.5 | 477 |

I. Neutral Deinking

Pulping was performed using wastepaper received from a mill in the United States. Pulping details are as previously described to prepare a 100 wt % ONP furnish using heated water. Hardness was adjusted using calcium chloride to 100 ppm during pulping. The resulting pH of the furnish was 7.2 as measured. The temperature during pulping and washing was 110° F. The pulp was treated using three wash sequences. The control run uses 7#/t of Lionsurf 890 to the pulper. The results are shown in Table 8.

TABLE 8

| | 3rd wash | |
| --- | --- | --- |
| Program | Bright | ERIC |
| 7#/t Lionsurf 890 (Pulp) | 52.6 | 398 |
| 7#/t Example 11 (Pulp) | 52.6 | 388 |
| 7#/t Example 1 (Pulp) | 51.2 | 471 |
| 7#/t Example 2 (Pulp) | 53 | 356 |

J. Neutral Deinking

Pulping was performed using wastepaper received from a mill in the United States. Pulping details are as previously described to prepare an 77 wt % ONP and 23 wt % OMG furnish using only water and calcium chloride to a desired hardness. The resulting pH was 7.1 as measured. Hardness was adjusted using calcium chloride to 180 ppm before both the pulping and the flotation stages. The temperature during pulping and flotation was 118° F. Flotation was for 2 minutes in the Wemco cell at 1 wt % consistency. The location of the addition, prior to pulping or prior to flotation, are denoted in Table 9 which contains the data from this work.

TABLE 9

| | Float Accepts | |
| --- | --- | --- |
| | Wet | Dry |
| 6#/t Comparative Example 3 (Pulp) | 52.1 | 439 |
| 6#/t Comparative Example 3 (Pulp) and 1.5#/t Example 35 (Float) | 52.1 | 422 |
| 6#/t Comparative Example 3 (Pulp) and 1.5#/t Example 18 (Float) | 53.1 | 378 |
| 6#/t Comparative Example 3 (Pulp) and 1.5#/t Example 41 (Float) | 52.6 | 388 |
| 6#/t Example 1 (Pulp) | 53.0 | 389 |
| 6#/t Example 1 (Pulp) and 1.5#/t Example 35 (Float) | 53.4 | 363 |
| 6#/t Example 1 (Pulp) and 1.5#/t Example 18 (Float) | 53.7 | 358 |
| 6#/t Example 1 (Pulp) and 1.5#/t Example 41 (Float) | 54.3 | 317 |
| 6#/t Example 2 (Pulp) | 52.8 | 394 |
| 6#/t Example 2 (Pulp) and 1.5#/t Example 35 (Float) | 53.4 | 353 |
| 6#/t Example 2 (Pulp) and 1.5#/t Example 18 (Float) | 53.8 | 339 |
| 6#/t Example 2 (Pulp) and 1.5#/t Example 41 (Float) | 54.0 | 317 |

K. Neutral Deinking

Pulping was performed using wastepaper from the United States. Pulping details are as previously described to prepare an 83 wt % ONP and 17 wt % OMG furnish using only water and calcium chloride to a desired hardness. The resulting pH was 7.1 as measured. Hardness was adjusted using calcium chloride to 180 ppm before both the pulping and the flotation stages. The temperature during pulping and flotation was 118° F. Flotation was for 2 minutes in the Wemco cell at 1 wt % consistency. The location of the addition, prior to pulping or prior to flotation, are denoted in Table 10 which contains the data from this work. All tests were performed at a total of 10#/t total addition of active deinking aids thus water in the formulation is discounted for dosage calculations to ensure identical addition levels of active ingredients.

TABLE 10

|  | Comparative Example 6 (Pulp) | Example 2 (Pulp) | Example 48 (Pulp) |
|---|---|---|---|
| Brightness | 47.9 | 53.6 | 53.1 |
| ERIC | 687 | 377 | 396 |

|  | Comparative Example 6 (Pulp)/ Example 41 (Float) | Example 2 (Pulp)/ Example 41 (Float) | Example 48 (Pulp)/ Example 41 (Float) |
|---|---|---|---|
| Brightness | 48.6 | 54.5 | 53.5 |
| ERIC | 646 | 328 | 370 |

|  | Comparative Example 7 (Pulp) | Example 11 (Pulp) | Example 48 (Pulp) |
|---|---|---|---|
| Brightness | 48.9 | 54.6 | 53.1 |
| ERIC | 624 | 335 | 396 |

|  | Comparative Example 7 (Pulp)/ Example 41 (Float) | Example 11 (Pulp)/ Example 41 (Float) | Example 48 (Pulp)/ Example 41 (Float) |
|---|---|---|---|
| Brightness | 48.8 | 55.3 | 53.5 |
| ERIC | 627 | 297 | 370 |

The invention claimed is:

1. A method for deinking waste paper comprising the steps of:
   a) converting the waste paper to a pulp slurry having a pH of from about 6.0 to about 8.8;
   b) contacting the pulp slurry with a deinking blend comprising a first alkoxylated fatty alcohol having a HLB of at least 13 and a first fatty acid; and
   c) separating ink from the pulp slurry by flotation, wherein the first alkoxylated fatty alcohol is of the formula:

$$R\text{—}O\text{—}[(CH_2\text{—}CH_2\text{—}O)_n\text{—}(CH_2\text{—}CH(CH_3)\text{—}O)_m]\text{—}H$$

wherein:
   a) R is a straight or branched alkyl group;
   b) n is from about 10 to about 100;
   c) m is from about 1 to about 35; and
   d) said n —(CH$_2$—CH$_2$—O)— units and said m —(CH$_2$—CH(CH$_3$)—O)— units are ordered in block or random format in any order or sequence.

2. The method of claim 1, wherein the first fatty acid is non-alkoxylated.

3. A method for deinking waste paper comprising the steps of:
   a) converting the waste paper to a pulp slurry having a pH of from about 6.0 to about 8.8;
   b) contacting the pulp slurry with a deinking blend comprising a first alkoxylated fatty alcohol having a HLB of at least 13 and a first fatty acid; and
   c) separating ink from the pulp slurry by flotation, wherein the first fatty acid is more than 20 wt % fatty acid having at least 16 carbon atoms and less than 60 wt % of saturated fatty acid having 14 carbons or less.

4. The method as in claim 1, wherein the first fatty acid comprises 6 to 20 carbon atoms.

5. The method of claim 1, wherein, in step b), the deinking blend further comprises a second alkoxyated fatty alcohol.

6. The method of claim 5, wherein the second alkoxylated fatty alcohol is of the formula:

$$R\text{—}O\text{—}[(CH_2\text{—}CH_2\text{—}O)_n\text{—}(CH_2\text{—}CH(CH_3)\text{—}O)_m]\text{—}H$$

wherein:
a) R is a straight or branched alkyl group;
b) n is from about 10 to about 100;
c) m is from about 1 to about 35; and
d) said n —(CH$_2$—CH$_2$—O)— units and said m —(CH$_2$—CH(CH$_3$)—O)— units are ordered in block or random format in any order or sequence.

7. A method for deinking waste paper comprising the steps of:
   a) converting the waste paper to a pulp slurry having a pH of from about 6.0 to about 8.8;
   b) contacting the pulp slurry with a deinking blend comprising a first alkoxylated fatty alcohol having a HLB of at least 13 and a first fatty acid; and
   c) separating ink from the pulp slurry by flotation, wherein the first alkoxylated fatty alcohol is of the formula:

$$R\text{—}O\text{—}[(CH_2\text{—}CH_2\text{—}O)_n\text{—}(CH_2\text{—}CH(CH_3)\text{—}O)_m]\text{—}H$$

wherein:
   a) R is a straight or branched alkyl group;
   b) n is from about 5 to about 40;
   c) m is from about 0 to about 20; and
   d) said n —(CH$_2$—CH$_2$—O)— units and said m —(CH$_2$—CH(CH$_3$)—O)— units are ordered in block or random format in any order or sequence.

8. The method of claim 7, wherein R is a C6 to C20 alkyl.

9. The method of claim 1, further comprising adding sodium silicate or sodium sulfite or a combination thereof to the pulp slurry.

10. The method of claim 1, further comprising adding a flotation additive to the slurry before or during separating ink from the pulp slurry.

11. The method of claim 1, further comprising adding one cationic additive to the slurry before or during the flotation.

12. The method of claim 11, wherein the cationic additive is a cationic polymer.

13. The method of claim 11, wherein the cationic additive is a cationic polyamine.

14. The method of claim 1, wherein the first alkoxylated fatty alcohol comprises at least 5 moles of ethoxylation.

15. The method of claim 1, wherein the alcohol portion of the first alkoxylated fatty alcohol comprises 6 to 20 carbon atoms.

16. The method of claim 1, wherein the pulp slurry in step a) has a pH of from about 6.8 to about 7.2.

17. The method of claim 1, wherein the blend is a liquid at a temperature of at least 22° C.

18. A method for deinking waste paper comprising the steps of:

a) converting the waste paper to a pulp slurry having a pH of from about 6.0 to about 8.8;
b) contacting the pulp slurry with a deinking blend comprising a first alkoxylated fatty alcohol having a HLB of at least 13 and a first fatty acid; and
c) separating ink from the pulp slurry by flotation, wherein the first alkoxylated fatty alcohol and first fatty acid are present in a ratio of from about 1:2 to about 2:1 by weight.

19. A method for deinking waste paper comprising the steps of:
a) converting the waste paper to a pulp slurry having a pH of from about 6.0 to about 8.8;
b) contacting the pulp slurry with a deinking blend comprising a first alkoxylated fatty alcohol and a second alkoxyated fatty alcohol having a HLB of at least 13 and a first fatty acid; and
c) separating ink from the pulp slurry by flotation, wherein the blend comprises alkoxylated fatty alcohol and fatty acid in a ratio of from about 1:2 to about 3:1 by weight.

20. The method of claim 1, wherein the blend comprises water or other diluent.

21. The method of claim 1, wherein the blend comprises from about 0 to about 25 weight % water or other diluent.

22. The method of claim 1, wherein the first fatty acid is a tall oil fatty acid.

23. A method for deinking waste paper comprising the steps of:
a) converting the waste paper to a pulp slurry having a pH of from about 6.0 to about 8.8;
b) contacting the pulp slurry with a deinking blend comprising a first alkoxylated fatty alcohol having a HLB of at least 13 and a first fatty acid; and
c) separating ink from the pulp slurry by flotation, wherein the blend further comprises a second fatty acid, wherein the second fatty acid is an alkoxylated fatty acid of the formula:

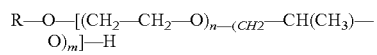

a) wherein:
b) $R^2$ is a straight or branched alkyl group comprising at least 6 carbon atoms;
c) p is from about 10 to about 100;
d) q is from about 0 to about 50; and
e) said p —($CH_2$—$CH_2$—O)— units and said q —($CH_2$—$CH(CH_3)$—O)— units are ordered in block or random format in any order or sequence.

24. The method of claim 23, wherein $R^2$ is a C6 to C20 alkyl.

25. A method for deinking waste paper comprising the steps of:
a) converting the waste paper to a pulp slurry having a pH of from about 6.0 to about 8.8;

b) contacting the pulp slurry with a deinking blend comprising a first alkoxylated fatty alcohol having a HLB of at least 13 and a first fatty acid; and
c) separating ink from the pulp slurry by flotation;
d) wherein the first alkoxylated fatty alcohol comprises at least five moles of ethoxylation; and
e) wherein the first fatty acid is a non-alkoxylated C6 to C20 fatty acid.

26. The method of claim 25, wherein the blend comprises a second fatty acid wherein the second fatty acid is an alkoxylated fatty acid.

27. A method for deinking waste paper comprising the steps of:
a) converting the waste paper to a pulp slurry having a pH of from about 6.0 to about 8.8;
b) contacting the pulp slurry with a deinking blend comprising a first alkoxylated fatty alcohol having a HLB of at least 13 and a first fatty acid; and
c) separating ink from the pulp slurry by flotation;
d) wherein the first alkoxylated fatty alcohol comprises at least five moles of ethoxylation; and
e) wherein the first fatty acid is a non-alkoxylated C6 to C20 fatty acid, wherein the first alkoxylated fatty alcohol is of the formula:

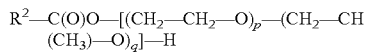

wherein:
a) R is a straight or branched alkyl group;
b) n is from about 5 to about 40;
c) m is from about 0 to about 20; and
d) said n —($CH_2$—$CH_2$—O)— units and said m —($CH_2$—$CH(CH_3)$—O)— units are ordered in block or random format in any order or sequence.

28. The method of claim 27, wherein n is 12 to 25 and m is 0.

29. A method for deinking waste paper comprising the steps of:
a) converting the waste paper to a pulp slurry having a pH of from about 6.0 to about 8.8;
b) contacting the pulp slurry with a deinking blend comprising a first alkoxylated fatty alcohol having a HLB of at least 13 and a first fatty acid; and
c) separating ink from the pulp slurry by flotation;
d) wherein the first alkoxylated fatty alcohol comprises at least five moles of ethoxylation; and
e) wherein the first fatty acid is a non-alkoxylated C6 to C20 fatty acid, wherein the first fatty acid is more than 20 wt % fatty acids having at least 16 carbon atoms and less than 60 wt % of saturated fatty acid having 14 carbons or less.

* * * * *